(12) United States Patent
Noe et al.

(10) Patent No.: US 10,393,381 B2
(45) Date of Patent: *Aug. 27, 2019

(54) UNITARY FLOW PATH STRUCTURE

(71) Applicant: General Electric Company, Schenectady, NY (US)

(72) Inventors: Mark Eugene Noe, West Chester, OH (US); Shawn Michael Pearson, Niskayuna, NY (US); Joshua Tyler Mook, Loveland, OH (US); Brandon ALlanson Reynolds, Cincinnati, OH (US); Jonathan David Baldiga, Amesbury, MA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,399

(22) Filed: Jan. 27, 2017

(65) Prior Publication Data

US 2018/0216822 A1  Aug. 2, 2018

(51) Int. Cl.
*F23R 3/00* (2006.01)
*F02C 3/14* (2006.01)
(Continued)

(52) U.S. Cl.
CPC ............... *F23R 3/002* (2013.01); *F01D 5/06* (2013.01); *F01D 5/225* (2013.01); *F01D 9/023* (2013.01);
(Continued)

(58) Field of Classification Search
CPC .... F02C 3/14; F02C 3/145; F02C 3/16; F02C 5/02; F02C 5/04; F02C 7/24; F02C 7/22;
(Continued)

(56) References Cited

U.S. PATENT DOCUMENTS 3,842,595 A   10/1974 Smith et al.
4,424,667 A    1/1984 Fanning
(Continued)

FOREIGN PATENT DOCUMENTS

EP   2466074   6/2012

OTHER PUBLICATIONS

U.S. Appl. No. 15/053,522, filed Feb. 25, 2016.
(Continued)

*Primary Examiner* — Jason H Duger
(74) *Attorney, Agent, or Firm* — Dority & Manning, P.A.

(57) ABSTRACT

Gas turbine engines, as well as outer walls and flow path assemblies of gas turbine engines, are provided. For example, an outer wall of a flow path comprises a combustor portion extending through a combustion section, and a turbine portion extending through at least a first turbine stage of a turbine section. The combustor and turbine portions are integrally formed as a single unitary structure that defines an outer boundary of the flow path. As another example, a flow path assembly comprises a combustor dome positioned a forward end of a combustor; an outer wall extending from the combustor dome through at least a first turbine stage; and an inner wall extending from the combustor dome through at least a combustion section. The combustor dome extends radially from the outer wall to the inner wall and is integrally formed with the outer and inner walls as a single unitary structure.

19 Claims, 14 Drawing Sheets

US 10,393,381 B2
Page 2

(51) Int. Cl.

| | | |
|---|---|---|
| *F02C 7/22* | (2006.01) | |
| *F01D 5/06* | (2006.01) | |
| *F01D 5/22* | (2006.01) | |
| *F01D 9/04* | (2006.01) | |
| *F01D 9/02* | (2006.01) | |
| *F01D 25/24* | (2006.01) | |

(52) U.S. Cl.
CPC ............. *F01D 9/04* (2013.01); *F01D 25/246* (2013.01); *F02C 3/14* (2013.01); *F02C 7/22* (2013.01); *F05D 2220/32* (2013.01); *F05D 2230/53* (2013.01); *F05D 2240/35* (2013.01); *F05D 2300/6033* (2013.01); *F23R 2900/00018* (2013.01); *Y02T 50/672* (2013.01)

(58) Field of Classification Search
CPC .. F23R 3/007; F23R 3/002; F23R 3/02; F23R 3/42; F23R 3/425; F23R 3/44; F23R 3/46; F23R 3/50; F23R 3/52; F23R 3/54; F23R 3/60; F23R 2900/00017; F23R 2900/00018; F01D 5/06; F01D 5/225; F01D 9/02; F01D 9/023; F01D 9/026; F01D 9/041; F01D 9/042; F01D 9/044; F01D 9/047; F01D 9/04; F01D 9/06; F01D 9/07; F01D 25/246; F05D 2220/32; F05D 2230/23; F05D 2230/232; F05D 2230/233; F05D 2230/234; F05D 2230/235; F05D 2230/236; F05D 2230/237; F05D 2230/238; F05D 2230/239; F05D 2230/53; F05D 2230/60; F05D 2240/35; F05D 2300/20–2300/2291; F05D 2300/6033; Y02T 50/672
See application file for complete search history.

(56) References Cited

U.S. PATENT DOCUMENTS

| | | | |
|---|---|---|---|
| 4,686,823 A | 8/1987 | Coburn et al. | |
| 5,015,540 A | 5/1991 | Borom et al. | |
| 5,142,859 A * | 9/1992 | Glezer | F01D 5/082 |
| | | | 415/115 |
| 5,207,064 A | 5/1993 | Ciokajlo et al. | |
| 5,265,413 A | 11/1993 | Cannon et al. | |
| 5,330,854 A | 7/1994 | Singh et al. | |
| 5,336,350 A | 8/1994 | Singh | |
| 5,392,614 A | 2/1995 | Coffinberty | |
| 5,406,787 A | 4/1995 | Terrier | |
| 5,465,571 A | 11/1995 | Clark | |
| 5,562,408 A * | 10/1996 | Proctor | F01D 11/24 |
| | | | 415/173.1 |
| 5,628,938 A | 5/1997 | Sangeeta et al. | |
| 5,630,700 A | 5/1997 | Olsen et al. | |
| 6,024,898 A | 2/2000 | Steibel et al. | |
| 6,403,158 B1 | 6/2002 | Corman | |
| 6,503,441 B2 | 1/2003 | Corman et al. | |
| 6,530,744 B2 * | 3/2003 | Liotta | F01D 9/041 |
| | | | 415/115 |
| 6,619,030 B1 | 9/2003 | Seda et al. | |
| 6,851,263 B2 * | 2/2005 | Stumpf | F23R 3/002 |
| | | | 60/750 |
| 6,893,214 B2 | 5/2005 | Alford et al. | |
| 6,991,427 B2 | 1/2006 | Scott | |
| 7,062,920 B2 | 6/2006 | McMasters et al. | |
| 7,186,078 B2 | 3/2007 | Tanaka | |
| 7,249,462 B2 | 7/2007 | Aumont et al. | |
| 7,329,087 B2 | 2/2008 | Cairo et al. | |
| 7,445,425 B2 | 11/2008 | Ferra et al. | |
| 7,950,234 B2 | 5/2011 | Radonovich et al. | |
| 8,141,371 B1 | 3/2012 | Habarou et al. | |
| 8,240,980 B1 | 8/2012 | Liang | |
| 8,246,305 B2 | 8/2012 | Lecuyer et al. | |
| 8,668,437 B1 * | 3/2014 | Liang | F01D 5/14 |
| | | | 415/115 |
| 8,753,073 B2 | 6/2014 | Albers et al. | |
| 8,776,525 B2 | 7/2014 | Oechsle | |
| 8,887,487 B2 | 11/2014 | Kupratis et al. | |
| 8,905,711 B2 | 12/2014 | Suciu et al. | |
| 9,039,364 B2 | 5/2015 | Alvanos et al. | |
| 9,169,736 B2 | 10/2015 | Hayford et al. | |
| 9,255,487 B2 | 2/2016 | Mayer et al. | |
| 2003/0000223 A1 | 1/2003 | Conete et al. | |
| 2004/0067316 A1 | 4/2004 | Gray et al. | |
| 2006/0010879 A1 | 1/2006 | Aumont et al. | |
| 2006/0123797 A1 * | 6/2006 | Zborovsky | F01D 9/041 |
| | | | 60/800 |
| 2010/0326078 A1 | 12/2010 | Pieussergues et al. | |
| 2011/0271684 A1 | 11/2011 | Corsmeier et al. | |
| 2013/0000324 A1 | 1/2013 | Alvanos et al. | |
| 2013/0014512 A1 | 1/2013 | Jarmon et al. | |
| 2013/0157037 A1 | 6/2013 | Matsumoto | |
| 2014/0261986 A1 * | 9/2014 | Lazur | F01D 5/282 |
| | | | 156/189 |
| 2014/0271144 A1 | 9/2014 | Landwehr et al. | |
| 2014/0311152 A1 | 10/2014 | Prociw et al. | |
| 2014/0363276 A1 | 12/2014 | Vetters et al. | |
| 2015/0204447 A1 | 7/2015 | Kloepfer | |
| 2015/0292402 A1 | 10/2015 | Razak | |
| 2016/0001873 A1 | 1/2016 | Schwarz | |
| 2016/0102574 A1 | 4/2016 | Peters | |
| 2016/0123187 A1 | 5/2016 | Leslie et al. | |
| 2016/0131084 A1 | 5/2016 | Kupratis et al. | |
| 2016/0201515 A1 | 7/2016 | Chang | |
| 2016/0208700 A1 | 7/2016 | Minnear et al. | |
| 2016/0265430 A1 | 9/2016 | Schwarz | |

OTHER PUBLICATIONS

U.S. Appl. No. 15/189,044, filed Jun. 22, 2016.
U.S. Appl. No. 15/212,337, filed Jul. 18, 2016.
U.S. Appl. No. 15/417,710, filed Jan. 27, 2017.
U.S. Appl. No. 15/417,745, filed Jan. 27, 2017.
U.S. Appl. No. 15/417,437, filed Jan. 27, 2017.
U.S. Appl. No. 15/417,602, filed Jan. 27, 2017.
Pratt & Whitney, PurePower Engine Family Specs Chart, http://www.pw.utc.com/Content/PurePowerPW1000G_Engine/pdf/B-11_PurePowerEngineFamily_SpecsChart.pdf.
International Search Report and Written Opinion issued in connection with corresponding Application No. PCT/US2017/064794 dated Mar. 22, 2018.
International Search Report and Written Opinion issued in connection with corresponding PCT Application No. PCT/US2017/064794 dated Mar. 22, 2018.

* cited by examiner

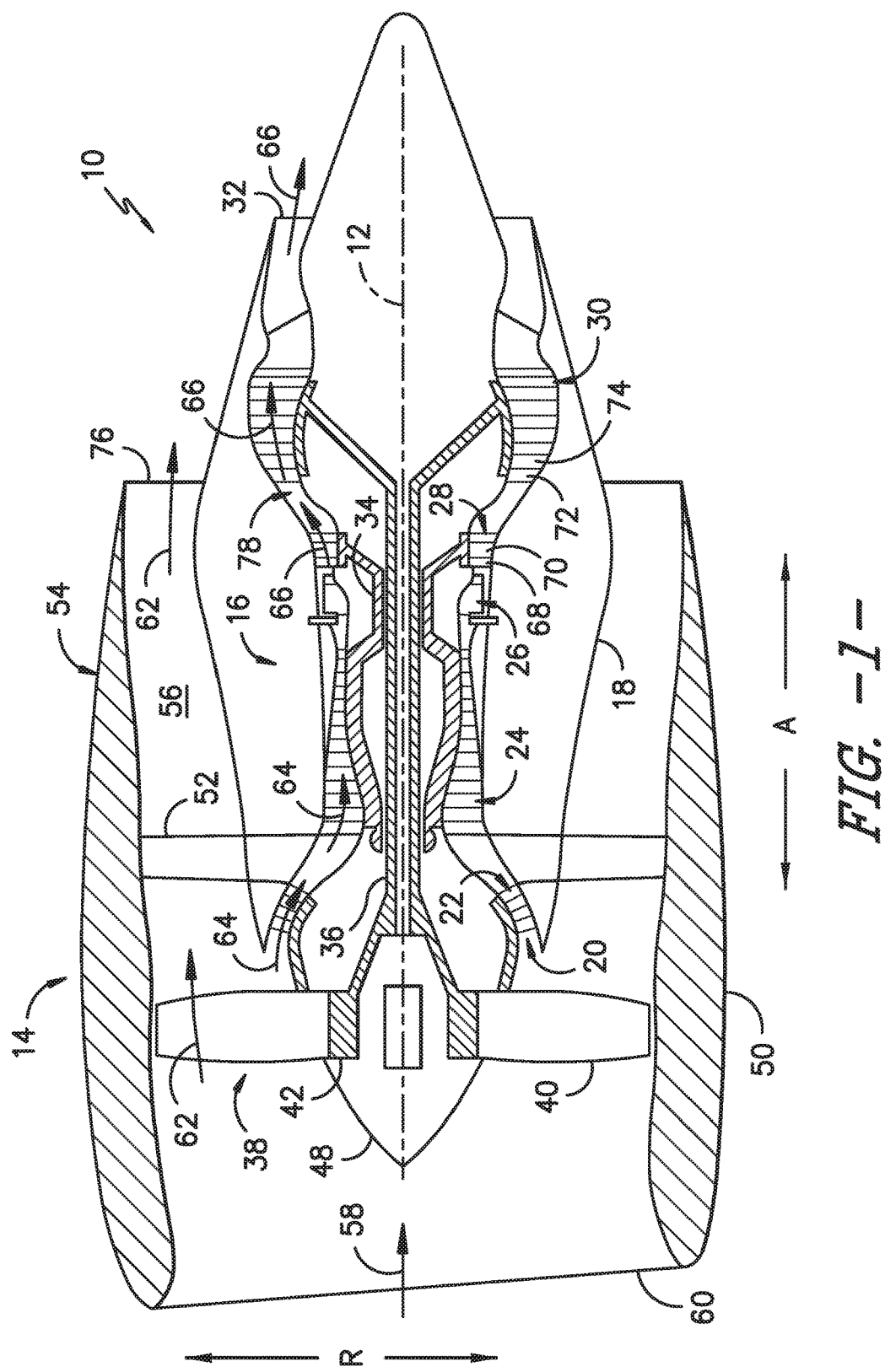
FIG. -1-

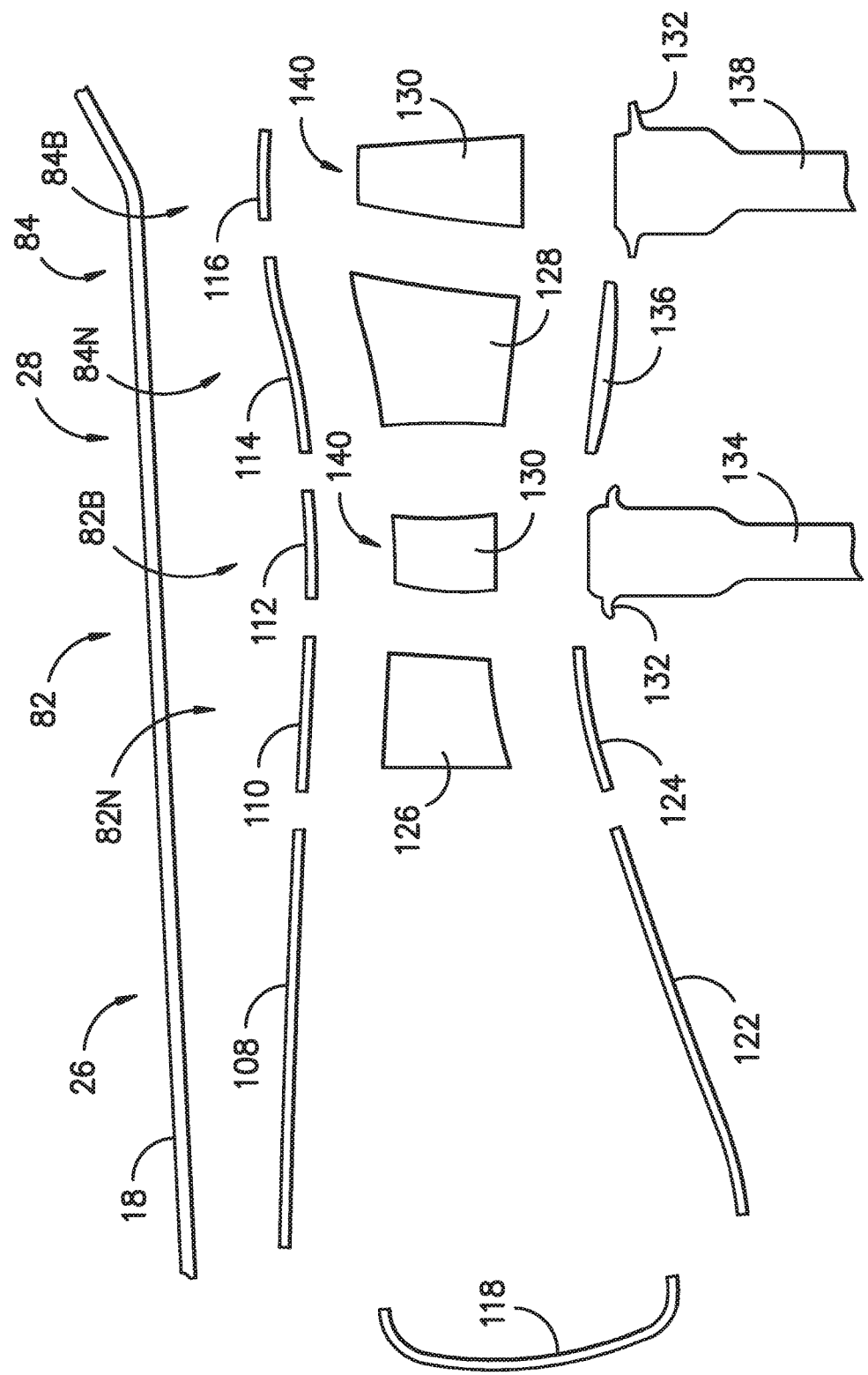
FIG. -2-

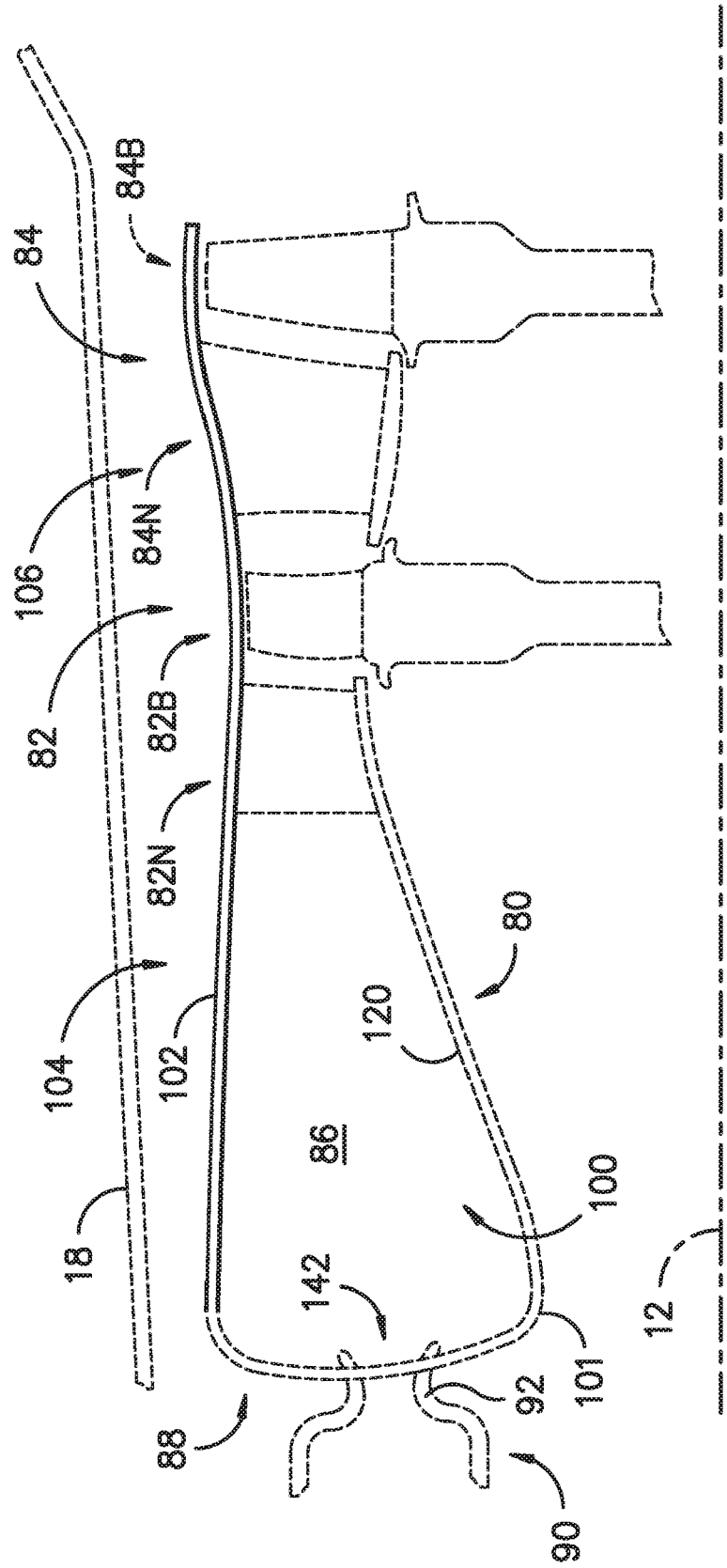
FIG. -3A-

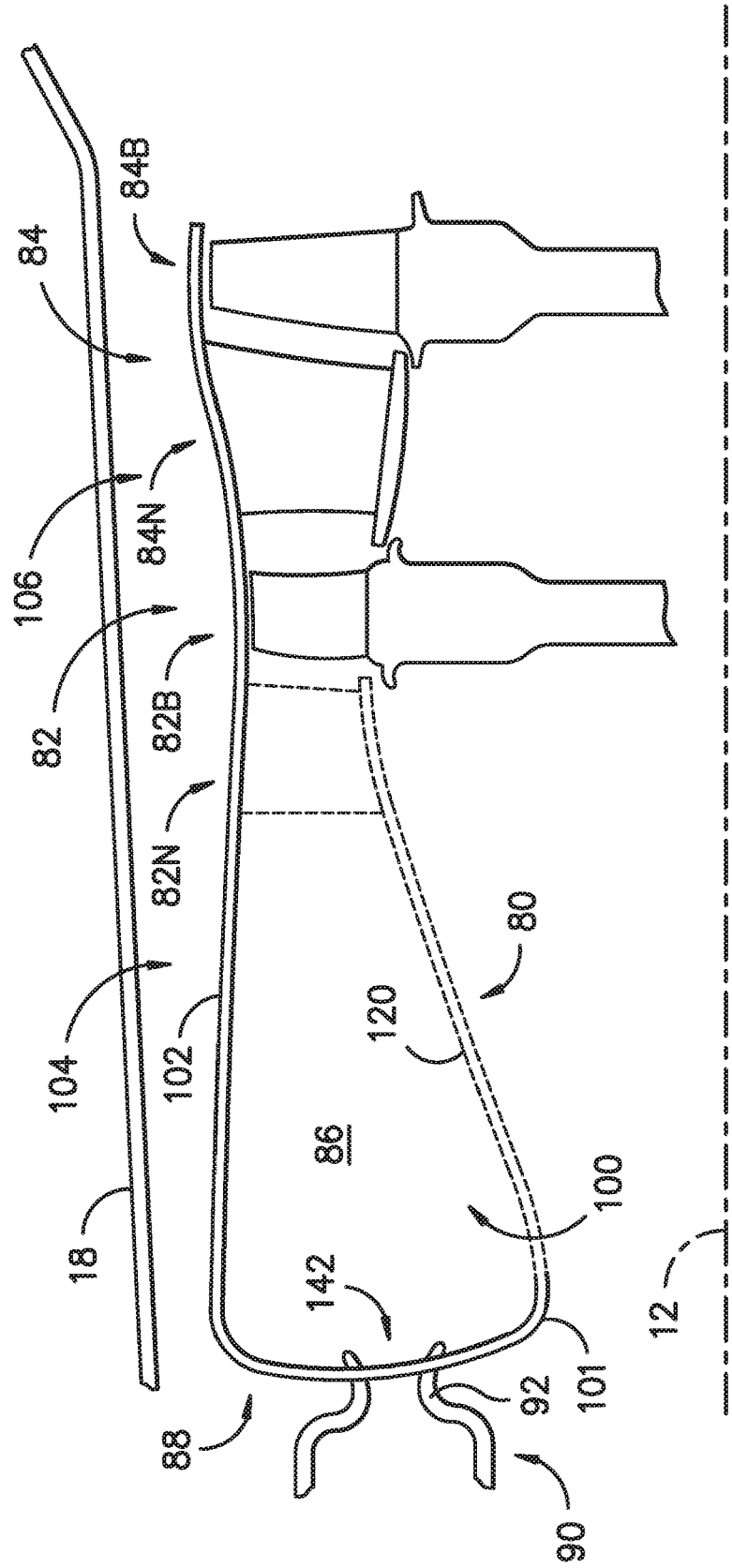
FIG. -3B-

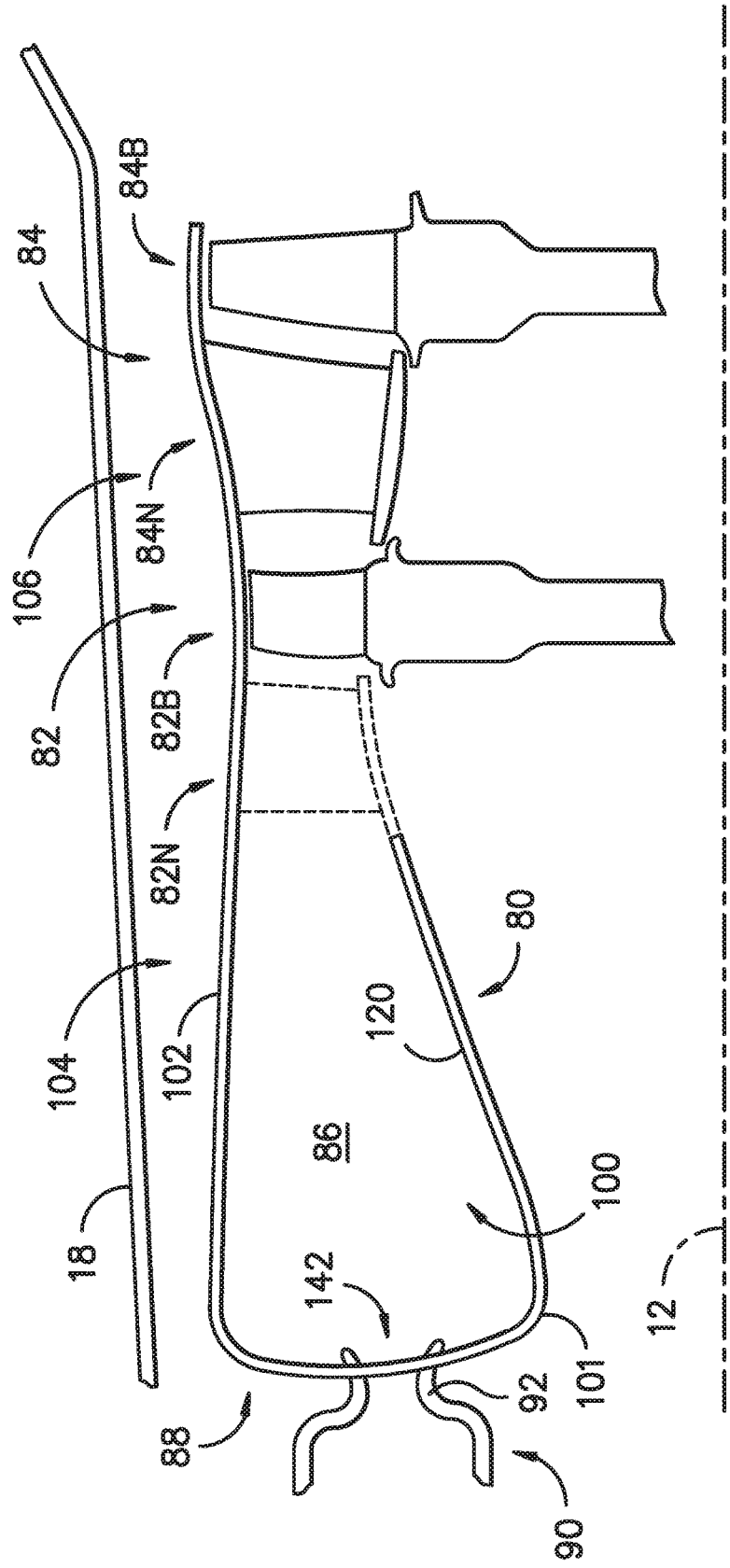
FIG. -3C-

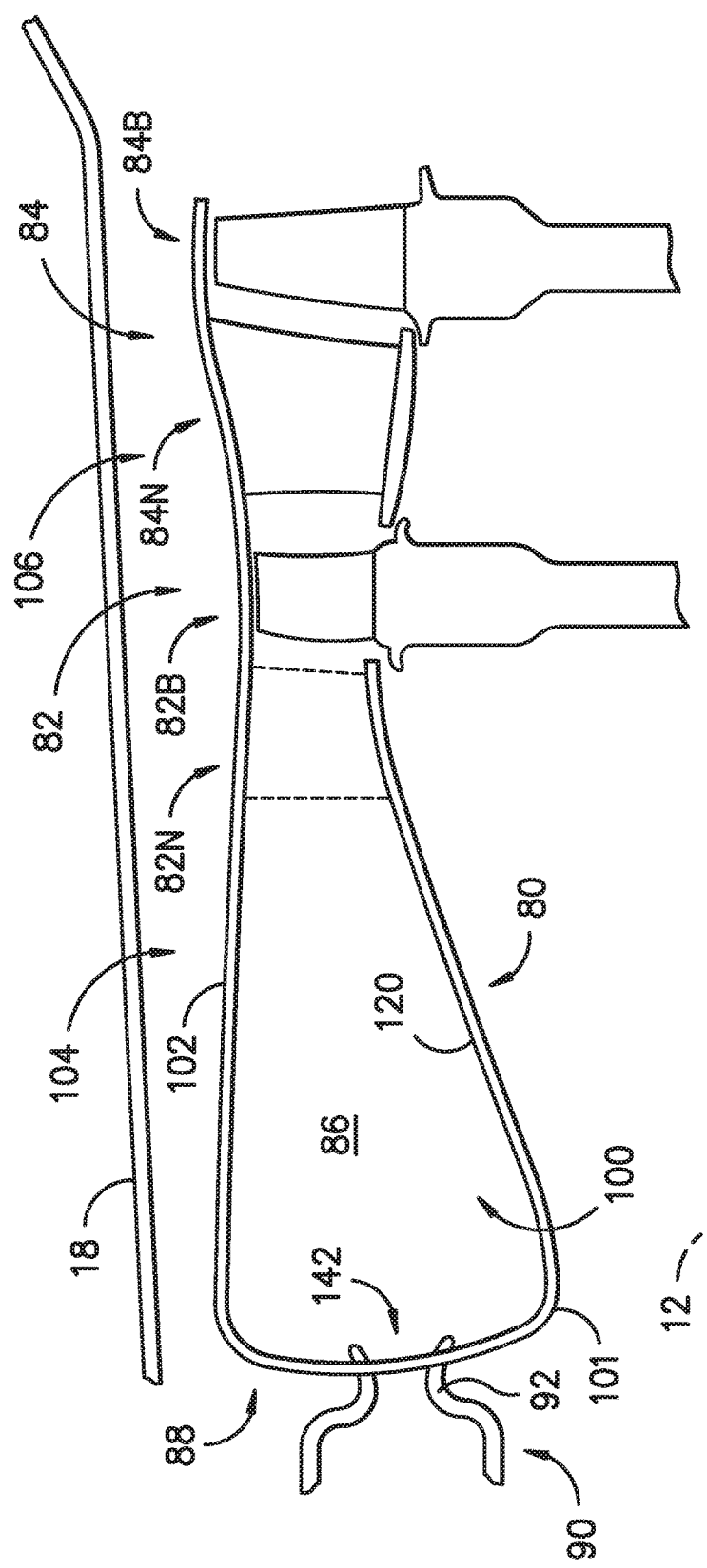
FIG. -3D-

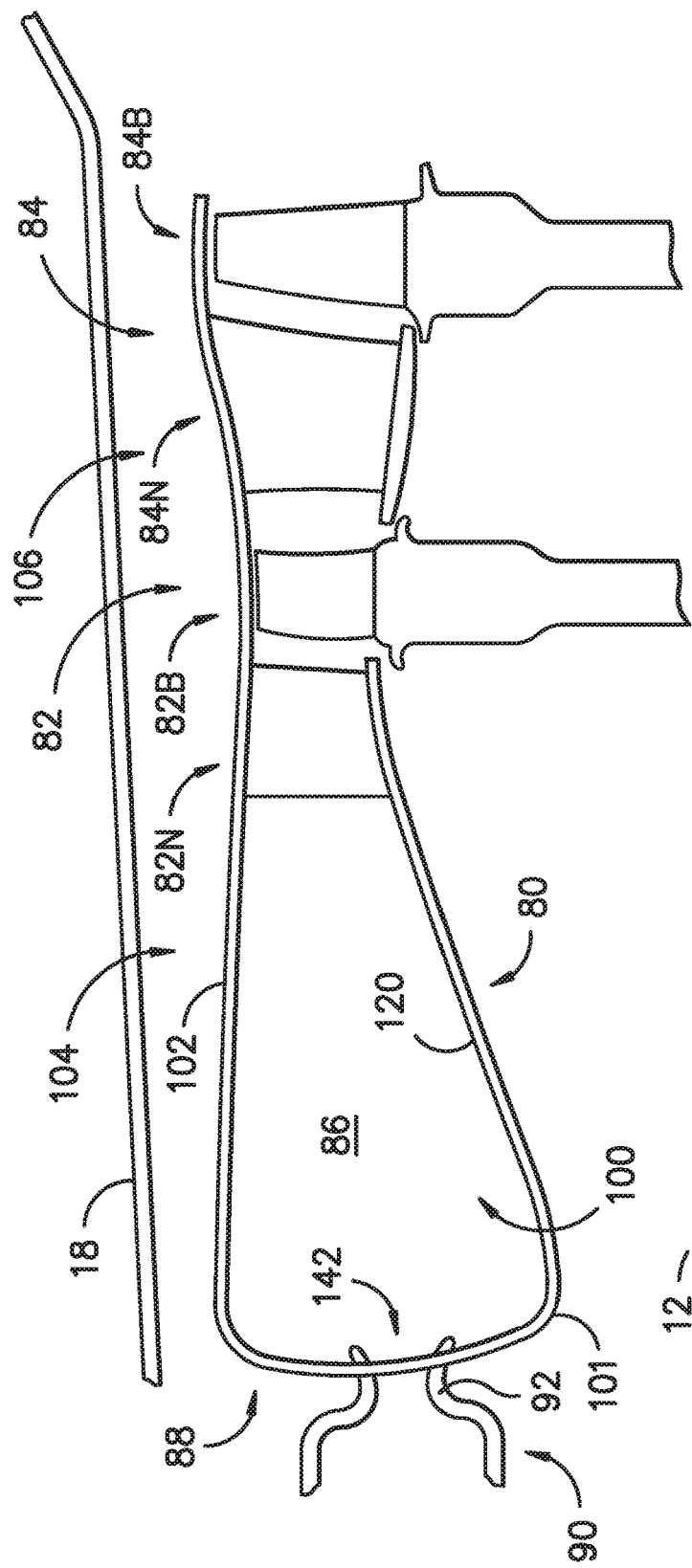
FIG. -3E-

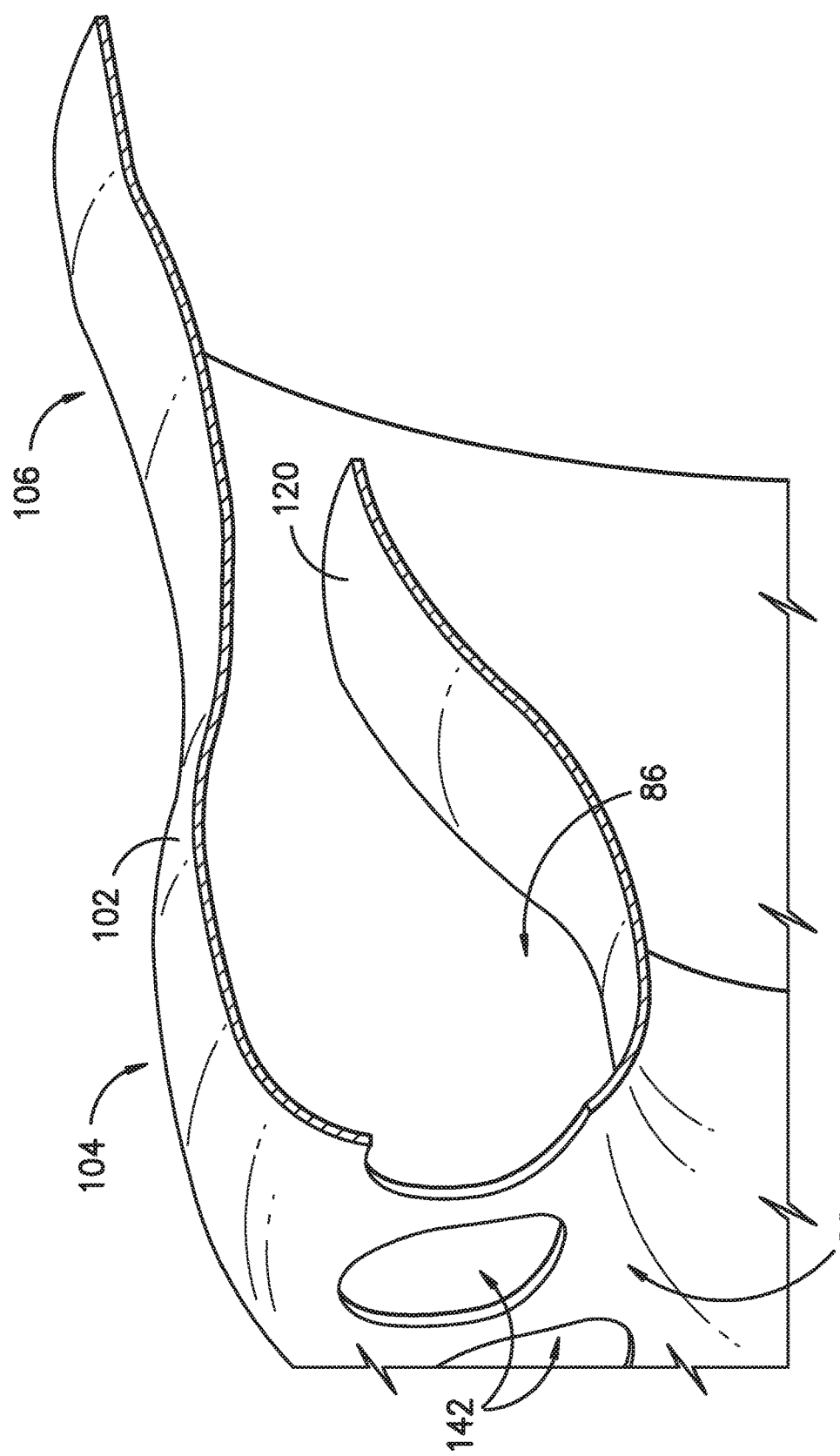
FIG. -3F-

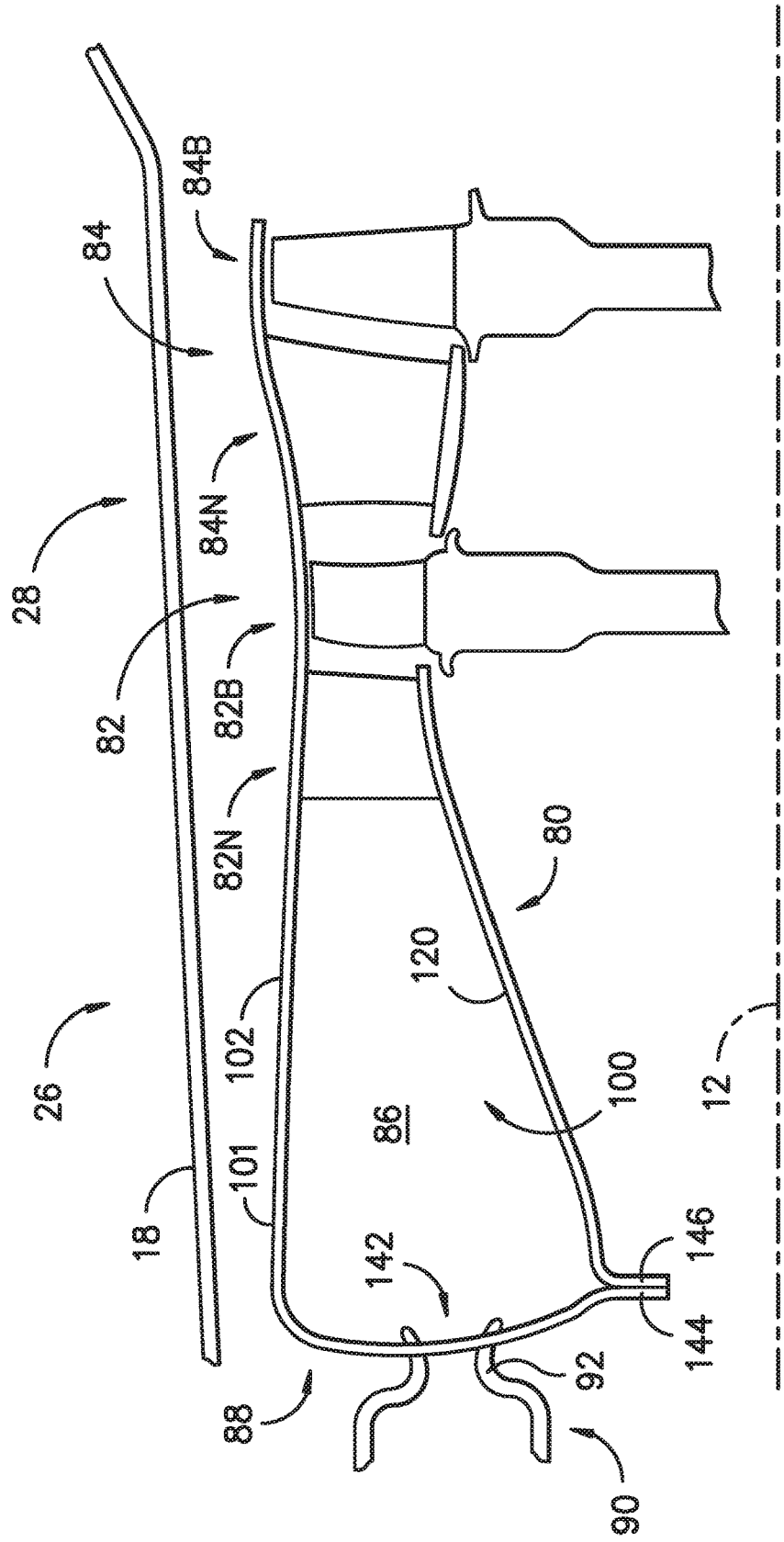
FIG. -4A-

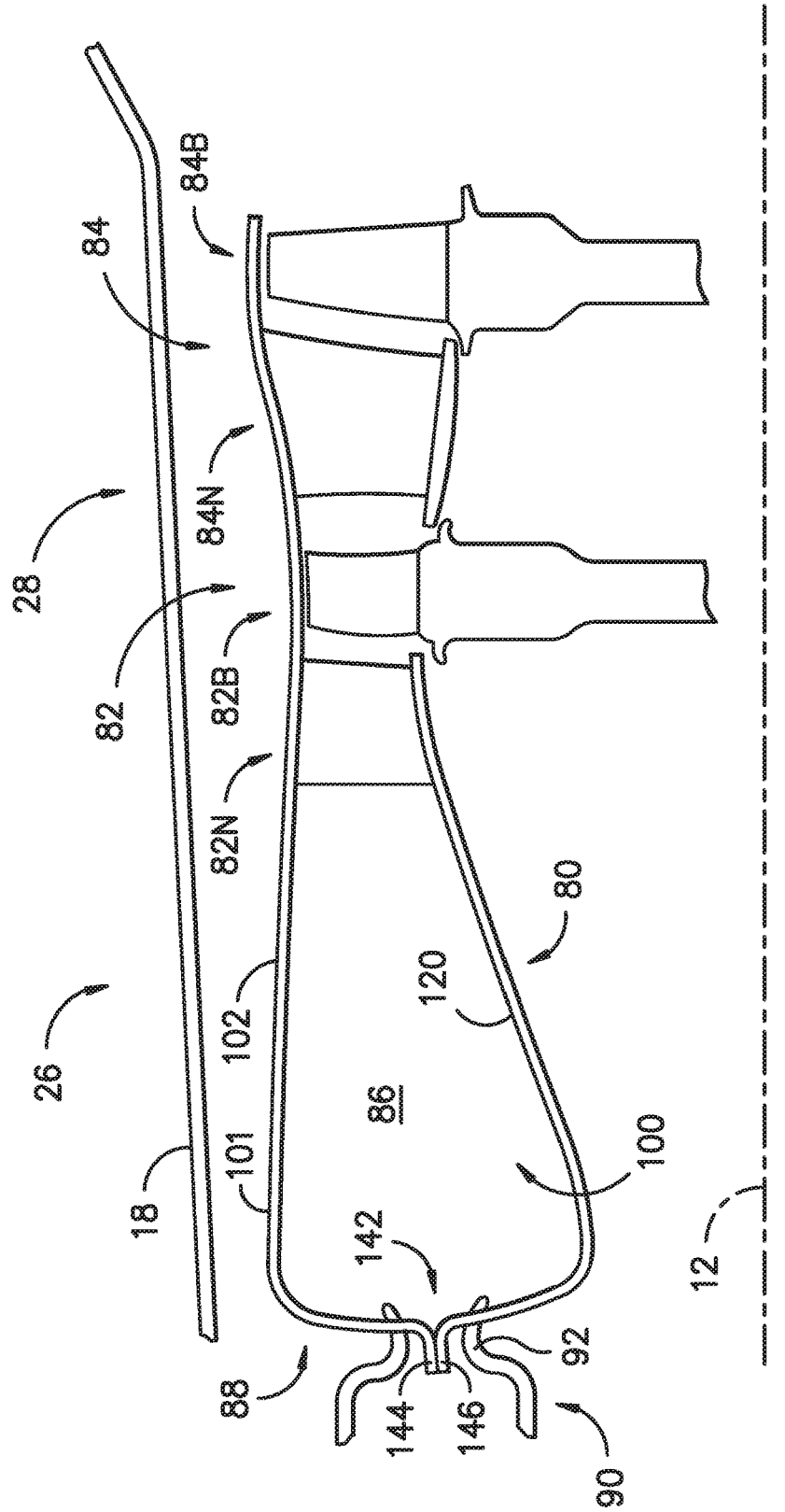
FIG. -4B-

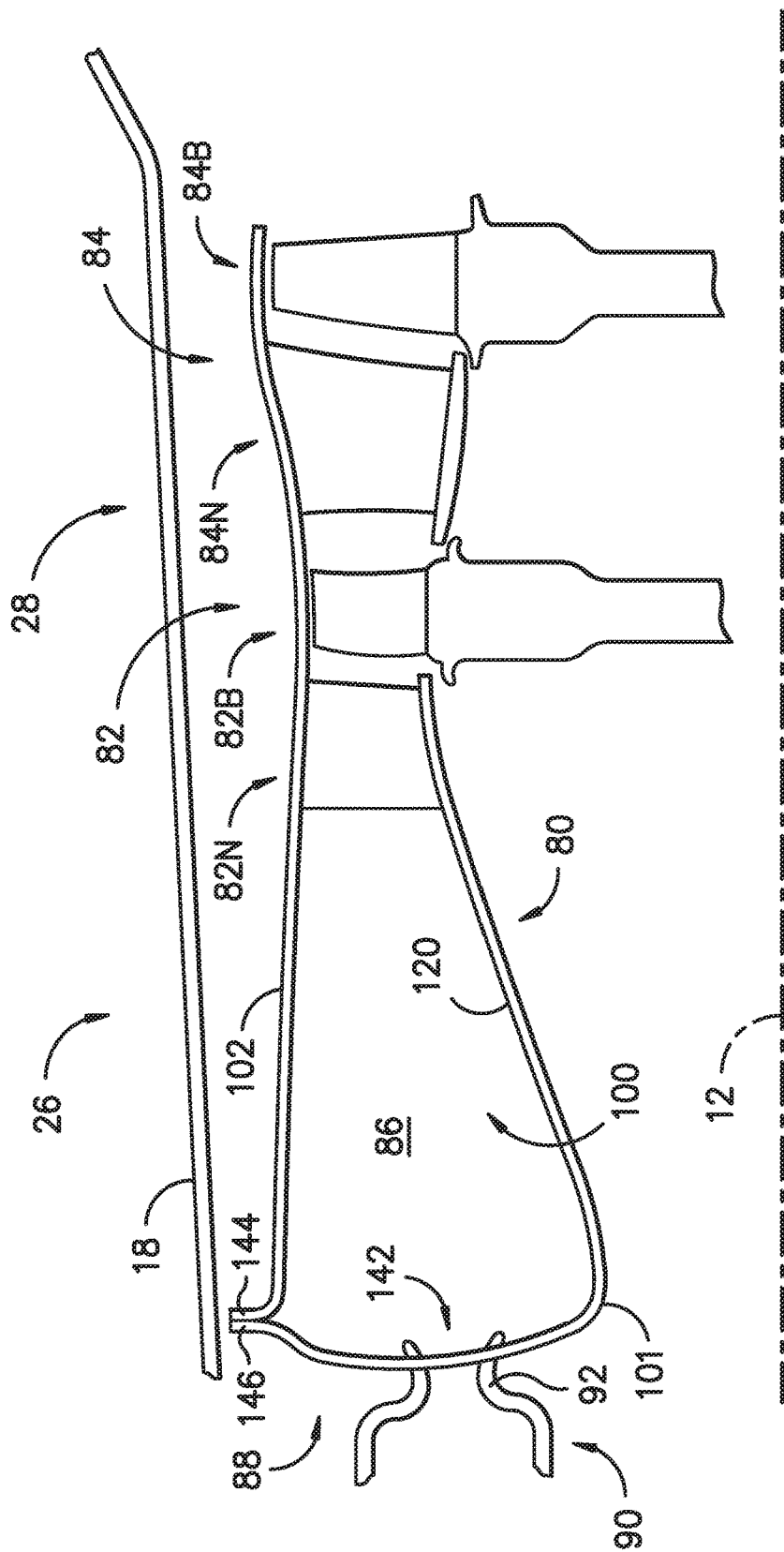

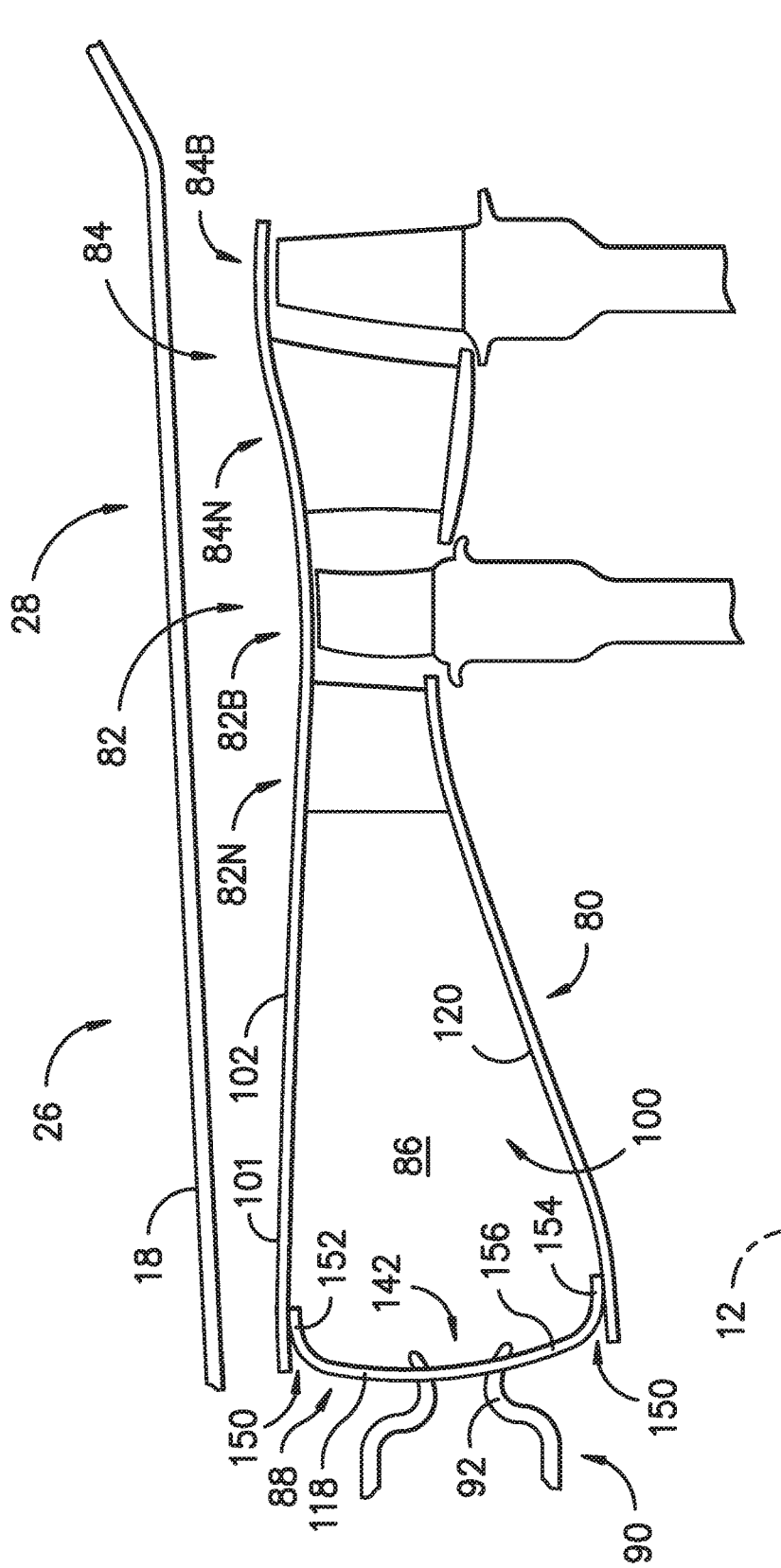
FIG. -5A-

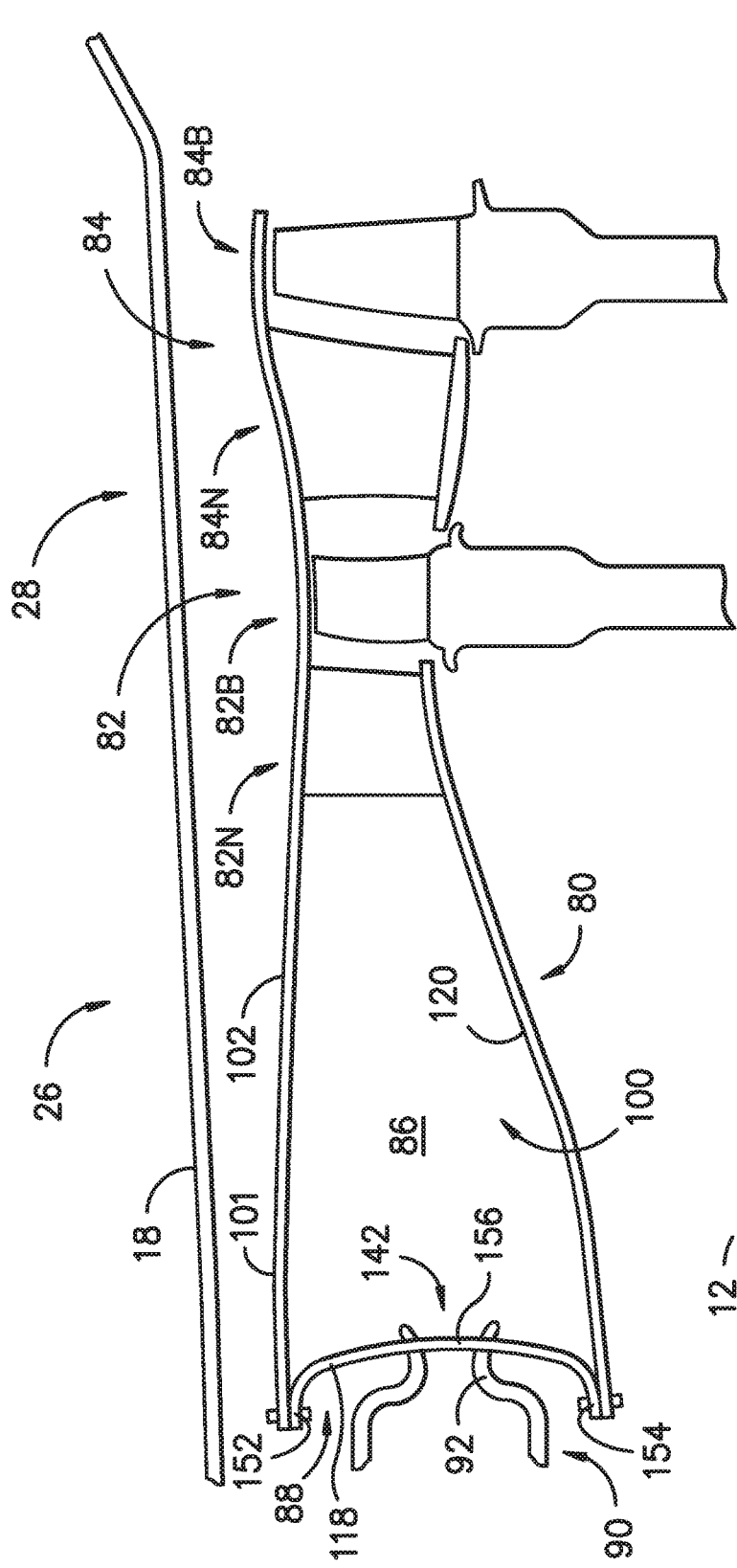
FIG. -5B-

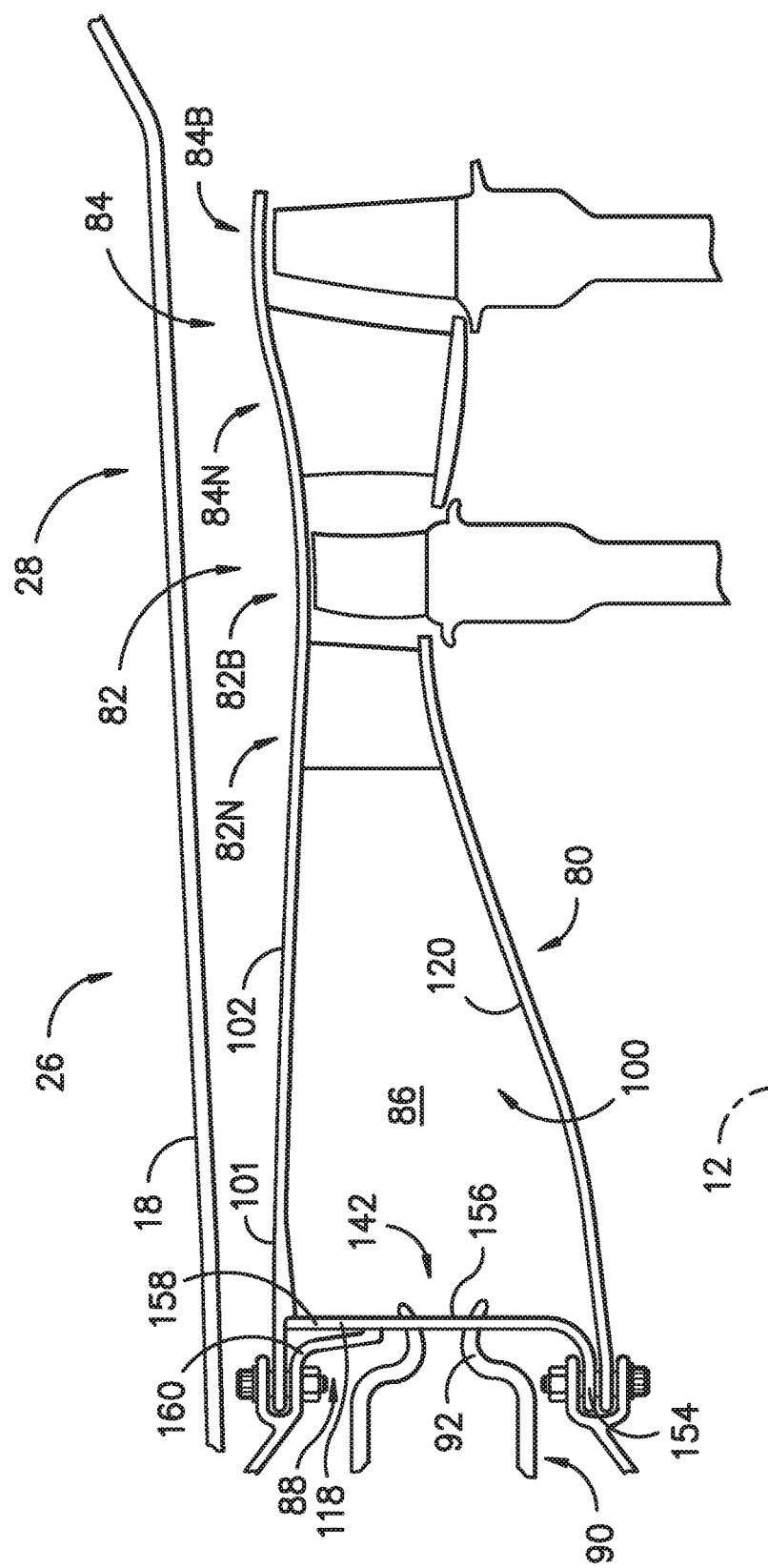
FIG. -5C-

UNITARY FLOW PATH STRUCTURE

FIELD

The present subject matter relates generally to gas turbine engines. More particularly, the present subject matter relates to unitary structures for defining a flow path within a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More particularly, the combustion section includes a combustor having a combustion chamber defined by a combustor liner. Downstream of the combustor, the turbine section includes one or more stages, for example, each stage may a plurality of stationary nozzle airfoils as well as a plurality of blade airfoils attached to a rotor that is driven by the flow of combustion gases against the blade airfoils. The turbine section may have other configurations as well, e.g., the turbine may be a counter-rotating turbine without stationary nozzle airfoils. In any event, a flow path is defined by an inner boundary and an outer boundary, which both extend from the combustor through the stages of the turbine section.

Typically, the inner and outer boundaries defining the flow path comprise separate components. For example, an outer liner of the combustor, a separate outer band of a nozzle portion of a turbine stage, and a separate shroud of a blade portion of the turbine stage usually define at least a portion of the outer boundary of the flow path. Utilizing separate components to form each of the outer boundary and the inner boundary may require one or more seals at each interface between the separate components to minimize leakage of fluid from the flow path. Thus, a great number of parts may be required to construct a flow path assembly, which can increase the complexity and weight of the gas turbine engine. Further, although seals may be provided, utilizing separate components in the flow path assembly provides several points for leakage of the fluid from the flow path. Increased weight, complexity, and leakage can negatively impact engine performance, as well as assembly of the engine during manufacturing.

Accordingly, improved flow path assemblies would be desirable. For example, a unitary outer boundary structure extending through the combustion section and at least a first stage of the turbine section would be beneficial. Further, a flow path assembly comprising a unitary inner boundary structure and a unitary outer boundary structure would be useful. Additionally, a flow path assembly comprising an integral combustor dome, inner boundary structure, and outer boundary structure would be helpful. Moreover, a gas turbine engine having a flow path assembly with a unitary outer boundary structure would be advantageous.

BRIEF DESCRIPTION

Aspects and advantages of the invention will be set forth in part in the following description, or may be obvious from the description, or may be learned through practice of the invention.

In one exemplary embodiment of the present disclosure, an outer wall of a flow path of a gas turbine engine is provided. The outer wall comprises a combustor portion extending through a combustion section of the gas turbine engine; and a turbine portion extending through at least a first turbine stage of a turbine section of the gas turbine engine. The combustor portion and the turbine portion are integrally formed such that the combustor portion and the turbine portion are a single unitary structure. The unitary structure defines an outer boundary of the flow path.

In another exemplary embodiment of the present disclosure, a flow path assembly for a gas turbine engine is provided. The flow path assembly comprises a combustor dome positioned a forward end of a combustor of a combustion section of the gas turbine engine. The flow path assembly further comprises an outer wall extending from the combustor dome through at least a first turbine stage of a turbine section of the gas turbine engine. The flow path assembly also comprises an inner wall extending from the combustor dome through at least the combustion section. The combustor dome extends radially from the outer wall to the inner wall. The combustor dome, outer wall, and inner wall are integrally formed such that the combustor dome, outer wall, and inner wall are a single unitary structure.

In a further exemplary embodiment of the present disclosure, a gas turbine engine is provided. The gas turbine engine comprises a combustion section and a turbine section. The turbine section includes a first turbine stage positioned immediately downstream of the combustion section and a second turbine stage positioned immediately downstream of the first turbine stage. The combustion section and the turbine section define a flow path. The combustion section includes an outer liner defining an outer boundary of the flow path through the combustion section. Further, each of the first turbine stage and the second turbine stage includes a nozzle portion and a blade portion. Each nozzle portion comprises an outer band defining an outer boundary of the flow path through the nozzle portion. Each blade portion comprises a shroud defining an outer boundary of the flow path through the blade portion. The outer liner, the outer bands, and the shrouds are integrally formed such that the outer liner, the outer bands, and the shrouds are a single unitary structure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic exploded cross-section view of a combustion section and a high pressure turbine section of the gas turbine engine of FIG. 1 according to an exemplary embodiment of the present subject matter.

FIG. 3A provides a schematic cross-section view of the combustion section and high pressure turbine section of FIG. 2 according to an exemplary embodiment of the present subject matter.

FIGS. 3B, 3C, 3D, and 3E provide schematic cross-section views of the combustion section and high pressure turbine section of FIG. 2 according to other exemplary embodiments of the present subject matter.

FIG. 3F provides a partial perspective view of a portion of an integral outer boundary structure and inner boundary structure of the combustion section and high pressure turbine section of FIG. 2 according to an exemplary embodiment of the present subject matter.

FIGS. 4A, 4B, 4C, 5A, 5B, and 5C provide schematic cross-section views of the combustion section and high pressure turbine section of FIG. 2 according to other exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, may comprise a ceramic matrix composite (CMC) material, which is a non-metallic material having high temperature capability. Of course, other components of turbofan engine 10, such as components of HP compressor 24, may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. As an example, the combustion section 26 may include a combustor formed from a CMC material and/or one or more stages of one or more stages of the HP turbine 28 may be formed from a CMC material. However, CMC components may be used in other sections as well, such as the compressor and/or fan sections. Of course, in some embodiments, other high temperature materials and/or other composite materials may be used to form one or more components of engine 10.

FIG. 2 provides an exploded view of a schematic cross-section of the combustion section 26 and the HP turbine 28 of the turbine section of the turbofan engine 10 according to an exemplary embodiment of the present subject matter. FIG. 3A provides an unexploded schematic cross-sectional view of the combustion section 26 and the HP turbine 28 of FIG. 2 that focuses on an outer boundary of a flow path through the combustion section 26 and HP turbine 28. The depicted combustion section 26 includes a generally annular combustor 80, and downstream of the combustion section 26, the HP turbine 28 includes a plurality of turbine stages. More particularly, for the depicted embodiment, HP turbine 28 includes a first turbine stage 82 and a second turbine stage 84. In other embodiments, the HP turbine 28 may comprise a different number of turbine stages; for example, the HP turbine 28 may include one turbine stage or more than two turbine stages. The first turbine stage 82 is positioned immediately downstream of the combustion section 26, and the second turbine stage 84 is positioned immediately downstream of the first turbine stage 82. Further, each turbine stage 82, 84 comprises a nozzle portion and a blade portion; the first turbine stage 82 includes nozzle portion 82N and blade portion 82B, and the second turbine stage 84 includes nozzle portion 84N and blade portion 84B. The nozzle portion 82N of the first turbine stage 82 is located immediately downstream of the combustion section 26, such that the nozzle portion 82N of the first turbine stage 82 also may be referred to as a combustor discharge nozzle. Moreover, combustor 80 defines a generally annular combustion chamber 86 such that the combustor 80 may be described as a generally annular combustor.

Additionally, as described in greater detail below, a flow path 100 through the combustion section 26 and the HP turbine 28 is defined by an outer boundary and an inner boundary of a flow path assembly 101. The outer and inner boundaries form a flow path for the combustion gases 66 through the combustion section 26 and HP turbine 28; thus, the flow path 100 may comprise at least a portion of the hot gas path 78 described above. Further, in other embodiments, the flow path 100 also may extend through LP turbine 30 and jet exhaust 32; in still other embodiments, the flow path 100 also may extend forward upstream of the combustion section 26, e.g., into HP compressor 24. As such, it will be appreciated that the discussion herein of the present subject matter with respect to combustion section 26 and HP turbine 28 is by way of example only and also may apply to different configurations of gas turbine engines and flow paths 100.

As shown in the exploded view of FIG. 2, the outer and inner boundaries may be defined by an outer wall 102 and an inner wall 120, respectively, which may include several portions of the combustion section 26 and HP turbine 28. For instance, the combustor 80 includes an outer liner 108 defining an outer boundary of the flow path through the combustor 80. Each nozzle portion 82N, 84N comprises an outer band defining an outer boundary of a flow path through the nozzle portion of each turbine stage, and each blade portion 82B, 84B comprises a shroud defining an outer boundary of a flow path through the blade portion of each turbine stage. More particularly, as shown in FIG. 2, the first turbine stage nozzle portion 82N comprises outer band 110, first turbine stage blade portion 82B comprises shroud 112, second turbine stage nozzle portion 84N comprises outer band 114, and second turbine stage blade portion 84B comprises shroud 116. These portions of the combustion section 26 and HP turbine 28 may comprise at least a portion of the outer wall 102, as described in greater detail below.

Further, as illustrated in FIG. 2, the combustor 80 includes an inner liner 122 defining an inner boundary of the flow path through the combustor 80. Each nozzle portion 82N, 84N comprises an inner band defining an inner boundary of the flow path through the nozzle portion of each turbine stage, and each blade portion 82B, 84B comprises one or more blade platforms that define an inner boundary of the flow path through the blade portion of each turbine stage. More particularly, as shown in FIG. 2, the first turbine stage nozzle portion 82N comprises inner band 124, first turbine stage blade portion 82B comprises blade platforms 132, second turbine stage nozzle portion 84N comprises inner band 136, and second turbine stage blade portion 84B comprises blade platforms 132. These portions of the combustion section 26 and HP turbine 28 may comprise at least a portion of the inner wall 122, as described in greater detail below.

Moreover, in the depicted embodiment, a combustor dome 118 extends radially across a forward end 88 of the combustor 80. The combustor dome 118 may be a part of outer wall 102, may be a part of inner wall 120, may be a part of both outer wall 102 and inner wall 120 (e.g., a portion of the combustor dome 118 may be defined by the outer wall 102 and the remainder may be defined by the inner wall 120), or may be a separate component from outer wall 102 and inner wall 120. Additionally, a plurality of nozzle airfoils is positioned in each of the nozzle portions 82N, 84N. Each nozzle airfoil 126 within the first turbine stage nozzle portion 82N extends radially from the outer band 110 to the inner band 124, and the nozzle airfoils 126 are spaced circumferentially about the longitudinal centerline 12. Each nozzle airfoil 128 within the second turbine stage nozzle portion 84N extends radially from the outer band 114 to the inner band 136, and the nozzle airfoils 128 are spaced circumferentially about the longitudinal centerline 12. Further, a plurality of blade airfoils 130 are positioned in each of the blade portions 82B, 84B. Each blade airfoil 130 within the first turbine stage blade portion 82B is attached to blade platform 132, which in turn is attached to a first stage rotor 134. The blade airfoils 130 attached to the first stage rotor 134 are spaced circumferentially about the longitudinal centerline 12. Similarly, each blade airfoil 130 within the second turbine stage blade portion 84B is attached to a blade platform 132, which in turn is attached to a second stage rotor 138. The blade airfoils 130 attached to the second stage rotor 138 are spaced circumferentially about the longitudinal centerline 12. Each blade airfoils 130 extends radially outward toward the outer wall 102, i.e., the outer boundary of the flow path 100, and a clearance gap is defined between a tip 140 of each blade airfoil 130 and the outer wall 102 such that each turbine rotor 134, 138 is free to rotate within its respective turbine stage. Although not depicted, each turbine rotor 134, 138 of the HP turbine 28 is connected to the HP shaft 34 (FIG. 1). In such manner, rotor blade airfoils 130 may extract kinetic energy from the flow of combustion gases through the flow path 100 defined by the HP turbine 28 as rotational energy applied to the HP shaft 34.

Accordingly, flow path 100 through the combustion section 26 and the HP turbine 28 is defined by a flow path assembly 101 having an inner boundary and an outer boundary, and the inner and outer boundaries define the flow path for the combustion gases 66 through the combustion section 26 and HP turbine 28. Portions of the outer boundary of the flow path assembly 101 may be integrated or unified into a single piece outer wall 102 that defines the radially outer boundary of the gas flow path 100. For instance, the outer wall 102 may include a combustor portion 104 extending through a combustion section, such as combustion section 26, and a turbine portion 106 extending through at least a first turbine stage of a turbine section, such as first turbine stage 82 of HP turbine 28. The combustor portion 104 and turbine portion 106 are integrally formed such that the combustor portion and the turbine portion are a single unitary structure, i.e., a unitary outer wall 102.

In the exemplary embodiment depicted in FIG. 3A, the outer wall 102 includes a combustor portion 104 extending through the combustion section 26 and a turbine portion 106 extending through at least the first turbine stage 82 and the second turbine stage 84 of the turbine section. In other embodiments, the turbine portion 106 may extend through fewer stages (e.g., through one turbine stage as just described) or through more stages (e.g., through one or more stages of the LP turbine 30 positioned downstream of HP turbine 28). The combustor portion 104 and the turbine portion 106 are integrally formed such that the combustor portion 104 and the turbine portion 106 are a single unitary structure, which is referred to herein as unitary outer wall 102.

The term "unitary" as used herein denotes that the associated component, such as the outer wall 102, is made as a single piece during manufacturing, i.e., the final unitary component is a single piece. Thus, a unitary component has a construction in which the integrated portions are inseparable and is different from a component comprising a plurality of separate component pieces that have been joined together and, once joined, are referred to as a single component even though the component pieces remain distinct and the single component is not inseparable (i.e., the pieces may be re-separated). The final unitary component may comprise a substantially continuous piece of material, or in other embodiments, may comprise a plurality of portions that are permanently bonded to one another. In any event, the various portions forming a unitary component are integrated with one another such that the unitary component is a single piece with inseparable portions.

As shown in FIG. 3A, the combustor portion 104 of the unitary structure forming outer wall 102 includes the outer liner 108 of the combustor 80. The turbine portion 106 includes the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B. As stated, these outer boundary components are integrated into a single piece to form the unitary structure that is outer wall 102. Thus, in the exemplary embodiment of FIG. 2, outer liner 108, outer band 110, shroud 112, outer band 114, and shroud 116 are integrally formed, i.e., constructed as a single unit or piece to form the integrated or unitary outer wall 102.

In some embodiments, other portions of the flow path assembly 101 may be integrated into the unitary structure of outer wall 102, and in still other embodiments, at least a portion of the outer boundary and the inner boundary are made as a single, unitary component such that the flow path assembly 101 may be referred to as an integrated flow path assembly. For example, referring to FIG. 3B, the combustor portion 104 of unitary outer wall 102 also may include the combustor dome 118 that extends across the forward end 88 of combustor 80. As such, in the exemplary embodiment of FIG. 3B, the outer liner 108, outer band 110, shroud 112, outer band 114, shroud 116, and combustor dome 118 are constructed as a single unit or piece to form the integrated or unitary outer wall 102. That is, the outer liner 108, outer bands 110, 114, shrouds 112, 116, and combustor dome 118 are integrally formed such that the outer liner 108, outer bands 110, 114, shrouds 112, 116, and combustor dome 118 are a single unitary structure.

As another example, referring to FIG. 3C, at least a portion of the inner wall 120 defining the inner boundary of the flow path 100 may be integrated with the outer wall 102 to form an integrated flow path assembly 101. In the exemplary embodiment of FIG. 3C, the combustor portion 104 further comprises the inner liner 122, such that the inner liner 122 is integrated with the unitary structure of the outer wall 102 shown in FIG. 3B. Thus, the outer liner 108, outer band 110, shroud 112, outer band 114, shroud 116, combustor dome 118, and inner liner 122 are integrally formed such that the outer liner 108, outer bands 110, 114, shrouds 112, 116, combustor dome 118, and inner liner 122 are a single unitary structure. In the exemplary embodiment of FIG. 3D, the turbine portion 106 further includes the inner band 124 of the first turbine stage nozzle portion 82N, such that the inner band 124 is integrated with the unitary structure of the flow path assembly 101 shown in FIG. 3C. Accordingly, the outer liner 108, outer band 110, shroud 112, outer band 114, shroud 116, combustor dome 118, inner liner 122, and inner band 124 are integrally formed such that the outer liner 108, outer bands 110, 114, shrouds 112, 116, combustor dome 118, inner liner 122, and inner band 124 are a single unitary structure. In the exemplary embodiment of FIG. 3E, the turbine portion 106 further includes the plurality of nozzle airfoils 126, such that each nozzle airfoil 126 of the plurality of nozzle airfoils 126 of the first turbine stage nozzle portion 82N is integrated with the unitary structure of the flow path assembly 101 shown in FIG. 3D. Therefore, the outer liner 108, outer band 110, shroud 112, outer band 114, shroud 116, combustor dome 118, inner liner 122, inner band 124, and nozzle airfoils 126 are integrally formed such that the outer liner 108, outer bands 110, 114, shrouds 112, 116, combustor dome 118, inner liner 122, inner band 124, and nozzle airfoils 126 are a single unitary structure.

Of course, the nozzle airfoils 126 of the first turbine stage nozzle portion 82N may be integrated with the outer wall 102 without being integrated with the inner wall 120. For example, the plurality of nozzle airfoils 126 may be formed as a single unit or piece with the outer liner 108, outer band 110, shroud 112, outer band 114, shroud 116 such that the outer liner 108, outer bands 110, 114, shrouds 112, 116, and nozzle airfoils 126 are a single unitary structure, i.e., a unitary outer wall 102. In other embodiments, the unitary outer wall 102 also may include the combustor dome 118, such that the outer liner 108, outer band 110, shroud 112, outer band 114, shroud 116, combustor dome 118, and nozzle airfoils 126 are integrally formed or constructed as a single unit or piece. In still other embodiments, the inner liner 122 also may be included, such that the outer liner 108, outer band 110, shroud 112, outer band 114, shroud 116, combustor dome 118, inner liner 122, and nozzle airfoils 126 are integrally formed as a single unitary structure, i.e., a unitary outer wall 102.

FIG. 3F provides a partial perspective view of a portion of an integral flow path assembly 101, having an outer wall 102 and inner wall 120 formed as a single piece component. As described with respect to FIG. 3D and shown in FIG. 3F, in some embodiments of the combustion gas flow path assembly 101, the outer liner 108, outer band 110, shroud 112, outer band 114, shroud 116, combustor dome 118, inner liner 122, and inner band 124 are integrally formed such that the outer liner 108, outer bands 110, 114, shrouds 112, 116, combustor dome 118, inner liner 122, and inner band 124 are a single unitary structure. FIG. 3F further illustrates that a plurality of openings 142 for receipt of fuel nozzle assemblies 90 and/or swirlers 92 may be defined in the forward end 88 of combustor 80 of the unitary flow path assembly 101. Further, it will be appreciated that FIG. 3F illustrates only a portion of the integral flow path assembly 101 and that, although its entire circumference is not illustrated in FIG. 3F, the flow path assembly 101 is a single, unitary piece circumferentially as well as axially. As such, the integral flow path assembly 101 defines a generally annular, i.e., generally ring-shaped, flow path between the outer wall 102 and inner wall 120.

Integrating various components of the outer and inner boundaries of the flow path assembly 101 as described above can reduce the number of separate pieces or components within engine 10, as well as reduce the weight, leakage, and complexity of the engine 10, compared to known gas turbine engines. For instance, known gas turbine engines employ seals or sealing mechanisms at the interfaces between separate pieces of the flow path assembly to attempt to minimize leakage of combustion gases from the flow path. By integrating the outer boundary, for example, as described with respect to unitary outer wall 102, split points or interfaces between the outer combustor liner and first turbine stage outer band, the first turbine stage outer band and the first turbine stage shroud, etc. can be eliminated, thereby eliminating leakage points as well as seals or sealing mechanisms required to prevent leakage. Similarly, by integrating components of the inner boundary, split points or interfaces between the integrated inner boundary components are eliminated, thereby eliminating leakage points and seals or sealing mechanisms required at the inner boundary. Accordingly, undesired leakage, as well as unnecessary weight and complexity, can be avoided by utilizing unitary components in the flow path assembly. Other advantages of unitary outer wall 102, unitary inner wall 120, and/or a unitary flow path assembly 101 will be appreciated by those of ordinary skill in the art.

As illustrated in FIGS. 3A through 3F, the outer wall 102 and the inner wall 120 define a generally annular flow path therebetween. That is, the unitary outer wall 102 circumferentially surrounds the inner wall 120; stated differently, the unitary outer wall 102 is a single piece extending 360° degrees about the inner wall 120, thereby defining a generally annular or ring-shaped flow path therebetween. As such, the combustor dome 118, which extends across the forward end 88 of the combustor 80, is a generally annular combustor dome 118. Further, the combustor dome 118 defines an opening 142 for receipt of a fuel nozzle assembly 90 positioned at forward end 88. The fuel nozzle assembly 90, e.g., provides combustion chamber 86 with a mixture of fuel and compressed air from the compressor section, which is combusted within the combustion chamber 86 to generate a flow of combustion gases through the flow path 100. The fuel nozzle assembly 90 may attach to the combustor dome 118 or may "float" relative to the combustor dome 118 and the flow path 100, i.e., the fuel nozzle assembly 90 may not be attached to the combustor dome 118. In the illustrated embodiments, the fuel nozzle assembly 90 includes a swirler 92, and in some embodiments, the swirler 92 may attach to the combustor dome 118, but alternatively, the swirler 92 may float relative to the combustor dome 118 and flow path 100. It will be appreciated that the fuel nozzle assembly 90 or swirler 92 may float relative to the combustor dome 118 and flow path 100 along both a radial direction R and an axial direction A or only along one or the other of the radial and axial directions R, A. Further, it will be understood that the combustor dome 118 may define a plurality of openings 142, each opening receiving a swirler 92 or other portion of fuel nozzle assembly 90.

As further illustrated in FIGS. 3A through 3F, as well as FIGS. 4A through 4C and FIGS. 5A and 5B discussed in greater detail below, the flow path assembly 101 generally defines a converging-diverging flow path 100. More particularly, the outer wall 102 and the inner wall 120 define a generally annular combustion chamber 86, which forms a forward portion of the flow path 100. Moving aft or downstream of combustion chamber 86, the outer wall 102 and inner wall 120 converge toward one another, generally in the region of first turbine stage 82. Continuing downstream of the first turbine stage 82, the outer wall 102 and inner wall 120 then diverge, generally in the region of second turbine stage 84. The outer wall 102 and inner wall 120 may continue to diverge downstream of the second turbine stage 84. In exemplary embodiments, e.g., as shown in FIG. 3A and referring only to the unitary outer wall 102, the first turbine stage nozzle outer band portion 110 and blade shroud portion 112 of the outer wall 102 converge toward the axial centerline 12. The second turbine stage nozzle outer band portion 114 and blade shroud portion 116 of the outer wall 102 diverge away from the axial centerline 12. As such, the outer boundary of flow path 100 formed by the unitary outer wall 102 defines a converging-diverging flow path 100.

Turning to FIGS. 4A and 4B, other exemplary embodiments of the present subject matter are illustrated. FIG. 4A provides a schematic cross-sectional view of the combustion section 26 and the HP turbine 28 of the turbine section according to one exemplary embodiment. FIG. 4B provides a schematic cross-sectional view of the combustion section 26 and the HP turbine 28 of the turbine section according to another exemplary embodiment. FIG. 4C provides a schematic cross-sectional view of the combustion section 26 and the HP turbine 28 of the turbine section according to yet another exemplary embodiment.

In the embodiments shown in FIGS. 4A, 4B, and 4C, the outer wall 102 is formed as a single unitary structure and the inner wall 120 is formed as another single unitary structure, and together, the unitary outer wall 102 and the unitary inner wall 120 define the flow path 100. However, it should be appreciated that the inner wall 120 need not be a single unitary structure. For example, in the embodiments shown in FIGS. 4A, 4B, and 4C, the inner wall 120 could comprise an inner liner 122 formed separately from inner band 124.

As described with respect to FIGS. 3A through 3F, the unitary outer wall 102 of FIGS. 4A, 4B, and 4C defines an outer boundary and the inner wall 120 defines an inner boundary of the flow path 100. Together, the unitary outer wall 102 and the inner wall 120 form a flow path assembly 101. The unitary outer wall 102 extends from the forward end 88 of combustor 80 of the combustion section 26 through at least the first turbine stage 82 of the HP turbine 28, and in the depicted embodiments, the unitary outer wall 102 extends from forward end 88 to an aft end of the second turbine stage 84 of HP turbine 28. The inner wall 120 includes at least the inner liner 122, and in embodiments in which the inner wall 120 is a unitary inner wall, the unitary inner wall 120 extends from the forward end 88 of the combustor 80 through the first turbine stage nozzle portion 82N. Accordingly, as shown in FIGS. 4A, 4B, and 4C, the outer wall 102 and inner wall 120 define the combustion chamber 86 of the combustor 80.

Like the embodiments described with respect to FIGS. 3A through 3F, the unitary outer wall 102 of the embodiments shown in FIGS. 4A, 4B, and 4C includes the outer liner 108, outer band 110, shroud 112, outer band 114, and shroud 116. Further, in the exemplary embodiment of FIG. 4A, the unitary outer wall 102 includes the combustor dome 118 defined at the forward end 88 of the combustor 80. Thus, the outer liner 108, outer bands 110, 114, shrouds 112, 116, and combustor dome 118 are integrally formed or constructed as a single unitary structure, i.e., outer wall 102 is a single unit or piece that includes combustor dome 118. Alternatively, as shown in the exemplary embodiment of FIG. 4B, the unitary outer wall 102 includes a radially outer portion of the combustor dome 118, such that the outer liner 108, outer band 110, shroud 112, outer band 114, shroud 116, and a portion of the combustor dome 118 are integrally formed or constructed as a single unitary structure, i.e., outer wall 102 is a single unit or piece that includes a portion combustor dome 118.

Moreover, like the embodiments described with respect to FIGS. 3A through 3F, the inner wall 120 of the embodiments shown in FIGS. 4A, 4B, and 4C at least includes the inner liner 122 of the combustor 80. In some embodiments, such as illustrated in FIGS. 4A and 4B, the inner wall 120 also includes the inner band 124 of the first turbine stage nozzle portion 82N. In such embodiments, the inner liner 122 and inner band 124 are integrally formed as a single unitary structure, i.e., as a single unit or piece that may be referred to as unitary inner wall 120. In other embodiments, as illustrated in FIG. 4B, the unitary inner wall 120 may include a radially inner portion of the combustor dome 118 such that the inner liner 122 and the portion of the combustor dome 118 are integrally formed or constructed as a single unitary structure or such that the inner liner 122, inner band 124, and the portion of the combustor dome 118 are integrally formed or constructed as a single unitary structure. That is, in some embodiments, the unitary inner wall 120 is a single unit or piece that includes a portion of the combustor dome 118 (and may or may not include the inner band 124). In still other embodiments, as shown in FIG. 4C, the unitary inner wall 120 includes the combustor dome 118 defined at the forward end 88 of the combustor 80. Thus, the combustor dome 118 and inner liner 122 (as well as inner band 124 in some embodiments) are integrally formed or constructed as a single unitary structure, i.e., inner wall 102 is a single unit or piece that includes combustor dome 118.

Further, the first turbine stage nozzle airfoils 126 may be integrated with the outer wall 102 and/or with the inner wall 120. As previously described, the first turbine stage nozzle airfoils 126 may be integrated with the outer wall 102, but in other embodiments, the first turbine stage nozzle airfoils 126 may be integrated with the inner wall 120 and not the outer wall 102 or may be integrated with both the outer and inner walls 102, 120. Whether formed separately from the walls 102, 120, integrated with the inner wall 120 to form a single unitary structure with the inner wall 120, integrated with the outer wall 102 to form a single unitary structure with the outer wall 102, or integrated with both the outer and inner walls 102, 120 to form a single unitary structure with the outer and inner walls 102, 120, a plurality of nozzle airfoils 126 extend from the inner wall 120 to the outer wall 102 within the first turbine stage nozzle portion 82N. Additionally, as described above, the first turbine stage 82 includes a first stage rotor 134 having a plurality of rotor blade airfoils 130 attached thereto. Downstream of the first turbine stage 82, a plurality of nozzle airfoils 128 extend from the inner band 136 to the outer wall 102 within the second turbine stage nozzle portion 84N, and the second turbine stage blade portion 84B includes a second stage rotor 138 having a plurality of rotor blade airfoils 130 attached thereto.

In the embodiments of FIGS. 4A, 4B and 4C, the integrated or unitary outer wall 102 extends circumferentially about the integrated or unitary inner wall 120. That is, the outer wall 102 circumferentially surrounds the inner wall 120 or the unitary outer wall 102 is a single piece extending 360° degrees about the inner wall 120. As such, the outer wall 102 and the inner wall 120 define a generally annular flow path therebetween. Further, the combustor dome 118 extends across the forward end 88 of the combustor 80, and whether integrated into the unitary outer wall 102 in whole or in part or integrated into the unitary inner wall 120 in whole or in part, the combustor dome 118 is a generally annular combustor dome 118.

In addition, the flow path assembly 101 illustrated in the embodiments of FIGS. 4A, 4B and 4C includes at least one opening 142 for receipt of a fuel nozzle assembly 90. As described with respect to FIGS. 3A through 3F, in some embodiments, the fuel nozzle assembly 90 may attach to the combustor dome 118, which may be integrated with the outer wall 102 in whole as in the embodiment of FIG. 4A or in part as shown in FIG. 4B, where the remainder is integrated with the inner wall 120. As also described, the combustor dome 118 may be integrated with the inner wall 120 in whole as illustrated in FIG. 4C, such that the fuel nozzle assembly 90 may attach to the combustor dome portion of unitary inner wall 120. In other embodiments, the fuel nozzle assembly 90 does not attach to the combustor dome 118 but floats relative to the combustor dome 118 and the flow path 100. As depicted, the fuel nozzle assembly 90 includes swirler 92, which may be the portion of fuel nozzle assembly 90 that attaches to the combustor dome 118 or the portion that floats relative to the combustor dome 118 and flow path 100. As previously described, the fuel nozzle assembly 90 or swirler 92 may float relative to the combustor dome 118 and flow path 100 along both the radial direction R and the axial direction A or only along one or the other of the radial and axial directions R, A. Moreover, as shown in FIG. 3F, the combustor dome 118 may define a plurality of openings 142, and each opening may receive a swirler 92 or other portion of fuel nozzle assembly 90.

Referring still to FIGS. 4A, 4B, and 4C, the unitary outer wall 102 and the inner wall 120 may define one or more features where the walls 102, 120 meet up with one another and, in some embodiments, may be attached to one another. For instance, in the embodiment of FIG. 4A, the outer wall 102 defines a flange 144 along a radially inner edge of the outer wall 102 at the forward end 88 of the combustor 80, and the inner wall 120 defines a flange 146 along a forward edge at the combustor forward end 88. In the embodiment of FIG. 4B, the outer wall flange 144 is defined along an edge of the combustor dome portion of the unitary outer wall 102, and similarly, the inner wall flange 146 is defined along an edge of the combustor dome portion of the unitary inner wall 120. As shown in FIG. 4C, the outer wall 102 may define the outer wall flange 144 along a forward edge of the outer wall 102, and the inner wall 120, which includes combustor dome 118 in the illustrated embodiment, may define the inner wall flange 146 along a radially outer edge of the inner wall 120. FIGS. 4A, 4B, and 4C illustrate that the flow path 100 may be discontinuous between the inner wall 120 and the outer wall 102, i.e., formed from a separate inner and outer boundaries rather than integral inner and outer boundaries as shown in FIGS. 3C through 3F. More particularly, the flow path 100 may be discontinuous where the outer wall flange 144 and the inner wall flange 146 are defined.

Thus, in the embodiment of FIG. 4A, the outer wall 102 may be secured to the inner wall 120 at flanges 144, 146 near a radially inner, forward portion of the combustor 80. Alternatively, the flanges 144, 146 as shown in FIG. 4A may define an area where the walls 102, 120 align or meet up with one another, e.g., flanges 144, 146 may define a slip joint between walls 102, 120. In the embodiment of FIG. 4B, the outer wall 102 may be secured to the inner wall 120 at flanges 144, 146 near a radial centerline of the combustor dome 118. In other embodiments, the flanges 144, 146 as illustrated in FIG. 4B may define an area where the walls 102, 120 align or meet up with one another, e.g., flanges 144, 146 may define a slip joint between walls 102, 120. In alternative embodiments, such the embodiment of FIG. 4C, the outer wall 120 may be secured to the inner wall 120 at flanges 144, 146 near a radially outer, forward portion of the combustor 80, or the flanges 144, 146 as shown in FIG. 4C may define an area where the walls 102, 120 align or meet up with one another, e.g., flanges 144, 146 may define a slip joint between walls 102, 120 at a radially outer, forward portion of combustor 80. In still other embodiments, the flanges 144, 146 may be defined in other locations such that the outer wall 102 and inner wall 120 are secured to, align, or meet up with one another at a location different from those depicted in FIGS. 4A, 4B, and 4C.

Any suitable fastener or other attachment means may be used to secure the outer and inner walls 102, 120 at the flanges 144, 146. For example, a plurality of apertures may be defined in each flange 144, 146, and each aperture of the outer wall flange 144 may align with an aperture of the inner wall flange 146 for receipt of a fastener in each pair of aligned apertures. It will be appreciated that the outer wall 102 and the inner wall 120 may be attached to one another in other ways as well. Of course, in other embodiments as described above, the outer wall 102 and inner wall 120 may not be secured to one another but may move radially and/or axially with respect to one another.

Turning now to FIGS. 5A, 5B, and 5C, schematic cross-sectional views are provided of the combustion section 26 and the HP turbine 28 of the turbine section of turbofan engine 10 according to other exemplary embodiments of the present subject matter. Unlike the embodiments of FIGS. 3B through 3F and FIGS. 4A through 4C, the combustor dome 118 of the embodiments shown in FIGS. 5A, 5B, and 5C is not integrated with either the outer wall 102 or the inner wall 120 in whole or in part. That is, the combustor dome 118 is a separate component from both the outer wall 102 and the inner wall 120.

Accordingly, as shown in FIGS. 5A, 5B, and 5C, the outer wall 102 is a unitary outer wall including a combustor portion 104, which extends through the combustion section 26 of engine 10, and a turbine portion 106, which extends through at least a first turbine stage of the turbine section of engine 10. In the embodiments shown in FIGS. 5A through 5C, the unitary outer wall 102 extends through the combustion section 26 to an aft end of HP turbine 28, which includes two turbine stages 82, 84. The combustor portion 104 and turbine portion 106 are integrally formed as a single unitary structure, i.e., unitary outer wall 102. For example, as shown and described with respect to FIG. 3A, the combustor portion 104 of the unitary outer wall 102 comprises the outer liner 108 of combustor 80. The turbine portion 106 of unitary outer wall 102 comprises outer band 110 of first turbine stage nozzle portion 82N, the shroud 112 of the first turbine stage blade portion 82B, the outer band 114 of the second turbine stage nozzle portion 84N, and the shroud 116 of the second turbine stage blade portion 84B. The turbine portion 106 of unitary outer wall 102 also may include a plurality of nozzle airfoils 126, which are integrally formed or constructed with the outer liner 108, outer bands 110, 114, and shrouds 112, 116 to form a single unitary structure, i.e., as a single unit or piece.

Further, as depicted in FIGS. 5A, 5B, and 5C, the inner wall 120 extends from the forward end 88 of the combustor 80 through at least the combustion section 26. For instance, the inner wall 120 may comprise separate components defining the inner boundary of the flow path 100. In other embodiments, the inner wall 120 may be a unitary inner wall 120 including an inner liner 122 and inner band 124 integrally formed as a single unitary structure, i.e., as a single unit or piece. As another example, the inner wall 120 may be a unitary inner wall 120 including inner liner 122, inner band 124, and first turbine stage nozzle airfoils 126 integrally formed as a single unitary structure, i.e., as a single unit or piece. Further, in the depicted embodiments of FIGS. 5A, 5B, and 5C, the flow path 100 may be discontinuous between the inner wall 120 and the outer wall 102, i.e., formed from a separate inner and outer boundaries rather than integral inner and outer boundaries as shown in FIGS. 3C through 3F. More particularly, the flow path 100 may be discontinuous between the combustor dome 118 and outer wall 102, as well as between combustor dome 118 and inner wall 120.

Referring particularly to FIG. 5A, the combustor dome 118 is positioned at forward end 88 of combustor 80 of combustion section 26 and extends radially from the outer wall 102 to the inner wall 120. The combustor dome 118 is configured to move axially with respect to the inner wall 120 and the outer wall 102 but may be attached to, and accordingly supported by, one or more fuel nozzle assemblies 90. More particularly, an axial slip joint 150 is formed between the combustor dome 118 and each of the outer wall 102 and the inner wall 120 such that the combustor dome 118 may move or float axially with respect to the inner wall 120 and outer wall 102. Allowing the combustor dome 118 to float relative to the outer wall 102 and inner wall 120 can help control the position of the fuel nozzle assembly 90 with respect to the combustor dome 118 and combustor 80. For example, the combustor dome 118, outer wall 102, and inner wall 120 may be made of a different material or materials than the fuel nozzle assembly 90. As described in greater detail below, in an exemplary embodiment, the combustor dome 118, outer wall 102, and inner wall 120 are made from a ceramic matrix composite (CMC) material, and the fuel nozzle assembly 90 may be made from a metallic material, e.g., a metal alloy or the like. In such embodiment, the CMC material thermally grows or expands at a different rate than the metallic material. Thus, allowing the combustor dome 118 to move axially with respect to outer and inner walls 102, 120 may allow for tighter control of the immersion of swirler 92 of fuel nozzle assembly 90 within combustor dome 118, as well as combustor 80, than if the combustor dome 118 was attached to the outer and inner walls 102, 120. Tighter control of the position of fuel nozzle assembly 90 and its components with respect to combustor 80 can reduce variation in operability and performance of engine 10.

Further, the outer wall 102 and inner wall 120 also may move axially and radially with respect to the combustor dome 118. By decoupling the combustor dome 118 from the walls 102, 120 and allowing relative movement between the walls 102, 120 and the combustor dome 118, stress coupling may be alleviated between the outer and inner walls 102, 120 and the combustor dome 118. Moreover, any leakage between the uncoupled combustor dome 118 and outer and inner walls 102, 120 may be utilized as purge and/or film starter flow.

As illustrated in FIG. 5A, the combustor dome 118 includes an outer wing 152 and an inner wing 154. The outer wing 152 extends aft along the outer wall 102, and the inner wing 154 extends aft along the inner wall 120. The wings 152, 154 may help guide the combustor dome 118 as it moves with respect to the outer wall 102 and inner wall 120, and the wings 152, 154 also may help maintain the radial position or alignment of the combustor dome 118 as it moves axially. The wings may provide a consistent gap between the dome 118 and walls 102, 120 for purge and/or film starter flow as previously described.

Turning to FIG. 5B, in other embodiments, each wing 152, 154 may extend forward from the combustor dome body 156, rather than aft as shown in FIG. 5A. The forward-extending wings 152, 154 may be used to mount the combustor dome 118 to a component other than the fuel nozzle assembly 90/swirler 92, e.g., to a metal dome supporting fuel nozzle assembly 90 and/or to either or both of the outer wall 102 and inner wall 120 at the forward end 88 of combustor 80. In some embodiments, the forward-extending wings 152, 154 of combustor dome 118 may be pinned or otherwise attached to the outer wall 102 and the inner wall 120 as shown in FIG. 5B. In still other embodiments, one of the wings 152, 154 may extend forward and the other wing 152, 154 may extend aft with respect to body 156, and the combustor dome 118 may be attached to the fuel nozzle assembly 90 or to another component.

Referring now to FIG. 5C, another exemplary embodiment of a separate combustor dome 118 and outer and inner walls 102, 120 is illustrated. In the embodiment illustrated in FIG. 5C, the combustor dome 118 includes a forward-extending inner wing 154 but no outer wing 152; rather, an outer end 158 of the combustor dome 118 extends to the outer wall 102. To retain the combustor dome 118 and seal against combustion gas leakage around the dome, the inner wing 154 is pinned with the inner wall 120 at the forward end 88 of the combustor 80, and the outer end 158 is preloaded against the outer wall 102. More particularly, a spring element 160 is pinned with the outer wall 102 at the combustor forward end 88, and the spring element 160 presses against the body 156 of the combustor dome 118 to preload the outer end 158 of the combustor dome 118 into a lip 162 defined in the outer wall 102. By utilizing the mounting configuration illustrated in FIG. 5C, positive definite retention and sealing of the combustor dome 118 may be provided while minimizing thermal stresses in the dome, which is particularly useful when the combustor dome 118 is made from a CMC material.

As previously stated, the outer wall 102, inner wall 120, and combustor dome 118 may comprise a CMC material. More particularly, in exemplary embodiments, the combustor portion 104 and the turbine portion 106 of flow path assembly 101 are integrally formed from a CMC material such that the resulting unitary structure is a CMC component. For example, where the combustor portion 104 includes the outer liner 108 of the combustor 80 and the turbine portion 106 includes the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B, the outer liner 108, outer bands 110, 114, and shrouds 114, 116 may be integrally formed from a CMC material to produce a unitary CMC outer wall 102. As described above, in other embodiments, additional CMC components may be integrally formed with the outer liner 108, outer bands 110, 114, and shrouds 114, 116 to construct a unitary CMC outer wall 102. Similarly, the inner wall 120 may be formed from a CMC material. For instance, where the inner wall 120 comprises separate components, e.g., inner liner 122, inner bands 124, 136, and blade platforms 132, each component of the inner wall 120 may be formed from a CMC material. In embodiments in which two or more components are integrated to form a unitary inner wall 120, the components may be integrally formed from a CMC material to construct a unitary CMC inner wall 120.

Examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC compo-nents may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a unitary structure, such as the outer wall 102 depicted in FIG. 3A, as a unitary CMC component. More specifically, a plurality of plies of a CMC material may be used to form each unitary structure. The plurality of plies may be interspersed with one another to integrate the various portions forming the unitary structure. As an example, the unitary outer wall 102 of FIG. 3A may be made from a plurality of outer liner plies, a plurality of first turbine stage outer band plies, a plurality of first turbine stage shroud plies, a plurality of second turbine stage outer band plies, and a plurality of second turbine stage shroud plies. Where the outer liner plies meet the first turbine stage outer band plies, ends of the outer liner plies may be alternated with ends of the outer band plies to integrate the plies for forming the outer liner portion with the plies for forming the first turbine stage outer band portion of the unitary outer wall 102. That is, any joints between the plies forming unitary outer wall 102 may be formed by alternating plies on one side of the joint with plies on the other side of the joint. As such, the plies for forming unitary outer wall 102 may be interspersed to integrate the plies and, thereby, each portion of the unitary outer wall 102. Of course, the CMC plies may be laid up in other ways as well to form the unitary structure. In addition, laying up the plurality of CMC plies may include defining features of the unitary structure or other component (e.g., inner liner 122 when not integrated with inner band 124 to from a unitary inner wall 120 or separate combustor dome 118 as shown in the embodiments of FIGS. 5A and 5B) such as openings 142 in combustor forward end 88, outer wall flange 144, and inner wall flange 146.

After the plurality of CMC plies are laid up to define a unitary CMC component preform, the preform is cured to produce a single piece, unitary CMC component, which is then fired and subjected to densification, e.g., silicon melt-infiltration, to form a final unitary CMC structure. Continuing with the above outer wall 102 example, the outer wall preform may be processed in an autoclave to produce a green state unitary outer wall 102. Then, the green state unitary outer wall 102 may be placed in a furnace to burn out excess binders or the like and then placed in a furnace with a piece or slab of silicon and fired to melt infiltrate the unitary outer wall 102 with at least silicon. More particularly, for unitary outer wall 102 formed from CMC plies of prepreg tapes that are produced as described above, heating (i.e., firing) the green state component in a vacuum or inert atmosphere decomposes the binders, removes the solvents, and converts the precursor to the desired ceramic matrix material. The decomposition of the binders results in a porous CMC body; the body may undergo densification, e.g., melt infiltration (MI), to fill the porosity. In the foregoing example where the green state unitary outer wall 102 is fired with silicon, the outer wall 102 undergoes silicon melt-infiltration. However, densification may be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component. The densified CMC body hardens to a final unitary CMC outer wall 102. In some embodiments, the final unitary structure may be finish machined, e.g., to bring the structure within tolerance or to define openings 142 in forward end 88, and/or an environmental barrier coating (EBC) may be applied to the unitary structure, e.g., to protect the unitary structure from the hot combustion gases 66. It will be appreciated that other methods or processes of forming CMC components, such as unitary CMC outer wall 102, unitary CMC inner wall 120, or the like may be used as well.

Additionally or alternatively, other processes for producing unitary components may be used to form unitary outer wall 102 and/or unitary inner wall 120, and the unitary structure(s) may be formed from other materials. In some embodiments, an additive manufacturing process may be used to form unitary outer wall 102 and/or unitary inner wall 120. For example, an additive process such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering or other known process may be used to produce a unitary outer wall 102 and/or a unitary inner wall 120. Generally, an additive process fabricates components using three-dimensional information, for example, a three-dimensional computer model, of the component. The three-dimensional information is converted into a plurality of slices, each slice defining a cross section of the component for a predetermined height of the slice. The component is then "built-up" slice by slice, or layer by layer, until finished. Superalloy metallic materials or other suitable materials may be used in an additive process to form unitary outer wall 102 and/or a unitary inner wall 120. In other embodiments, a unitary outer wall 102 and/or unitary inner wall 120 may be formed using a forging or casting process. Other suitable processes or methods may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An outer wall of a flow path of a gas turbine engine, the outer wall comprising:
    a combustor portion extending through a combustion section or the gas turbine engine; and
    a turbine portion extending through at least a first turbine stage and a second turbine stage of a turbine section of the gas turbine engine,
    wherein the combustor portion comprises an outer liner of a combustor of the combustion section,
    wherein the turbine portion comprises
        an outer band of a nozzle portion of the first turbine stage,
        a shroud of a blade portion of the first turbine stage,
        an outer band of a nozzle portion of the second turbine stage, and
        a shroud of a blade portion of the second turbine stage,
    wherein the combustor portion and the turbine portion are integrally formed such that the combustor portion and the turbine portion are a single unitary structure, and
    wherein the single unitary structure defines an outer boundary of the flow path.

2. The outer wall of claim 1, wherein the combustor portion further comprises a combustor dome extending across a forward end of the combustor and an inner liner of the combustor, and wherein the turbine portion further comprises an inner band of the nozzle portion of the first turbine stage.

3. The outer wall of claim 1, wherein the turbine portion further comprises a plurality of nozzle airfoils within the nozzle portion of the first turbine stage.

4. The outer wall of claim 1, wherein the outer band and the shroud of the first turbine stage converge toward an axial centerline of the gas turbine engine, and wherein the outer band and the shroud of the second turbine stage diverge away from the axial centerline.

5. The outer wall of claim 1, wherein the combustor portion and the turbine portion are integrally formed from a ceramic matrix composite material such that the single unitary structure is a ceramic matrix composite component.

6. A flow path assembly of a gas turbine engine, the flow path assembly comprising:
    a combustor dome positioned at a forward end of a combustor of a combustion section of the gas turbine engine;
    an outer wall having a combustor portion extending from the combustor dome through the combustion section and a turbine portion extending through at least a first turbine stage and a second turbine stage of a turbine section of the gas turbine engine; and an inner wall extending from the combustor dome through at least the combustion section, wherein the combustor dome extends radially from the outer wall to the inner wall, wherein the turbine portion comprises
an outer band of a nozzle portion of the first turbine stage,
a shroud of a blade portion of the first turbine stage,
an outer band of a nozzle portion of the second turbine stage, and
a shroud of a blade portion of the second turbine stage, and wherein the combustor dome, the combustor portion and the turbine portion are integrally formed such that the combustor dome, the combustor portion and the turbine portion are a single unitary structure.

7. The flow path assembly of claim 6, wherein the single unitary structure defines an annular flow path.

8. The flow path assembly of claim 6, wherein the combustor dome defines an opening for receipt of a fuel nozzle assembly.

9. The flow path assembly of claim 6, wherein the flow path assembly further comprises a plurality of nozzle airfoils extending from the inner wall to the outer wall within the nozzle portion of the first turbine stage, and wherein the plurality of nozzle airfoils are integrally formed with the combustor dome, the combustor portion and the turbine portion such that the plurality of nozzle airfoils are a portion of the single unitary structure.

10. The flow path assembly of claim 6, wherein the single unitary structure is formed from a plurality of pre-impregnated ceramic matrix composite tapes.

11. The flow path assembly of claim 6, wherein the single unitary structure is formed from silicon-carbide fiber cloth.

12. A gas turbine engine, comprising:
a combustion section; and
a turbine section including a first turbine stage positioned immediately downstream of the combustion section and a second turbine stage positioned immediately downstream of the first turbine stage,
wherein the combustion section and the turbine section define a flow path,
wherein the combustion section includes an outer liner defining an outer boundary of the flow path through the combustion section,
wherein each of the first turbine stage and the second turbine stage includes a nozzle portion and a blade portion, each nozzle portion comprising an outer band defining an outer boundary of the flow path through the nozzle portion, each blade portion comprising a shroud defining an outer boundary of the flow path through the blade portion, wherein the outer liner, the outer bands, and the shrouds are integrally formed such that the outer liner, the outer bands, and the shrouds are a single unitary structure.

13. The gas turbine engine of claim 12, wherein the single unitary structure is a unitary outer wall of the flow path, the unitary outer wall defining a unitary outer boundary of the flow path through the combustion section, the first turbine stage, and the second turbine stage.

14. The gas turbine engine of claim 12, wherein the combustion section further comprises an inner liner defining an inner boundary of the flow path through the combustion section, and wherein the inner liner is integrally formed with the outer liner, the outer bands, and the shrouds such that the inner liner is a portion of the single unitary structure.

15. The gas turbine engine of claim 14, wherein the nozzle portion of the first turbine stage and the nozzle portion of the second turbine stage each comprises an inner band defining an inner boundary of the flow path therethrough, and wherein the inner band of the nozzle portion of the first turbine stage is integrally formed with the inner liner, the outer liner, the outer bands, and the shrouds such that the inner band of the nozzle portion of the first turbine stage is a portion of the single unitary structure.

16. The gas turbine engine of claim 15, wherein the nozzle portion of the first turbine stage further comprises a plurality of nozzle airfoils integrally formed with the inner liner, the inner band of the nozzle portion of the first turbine stage, the outer liner, the outer bands, and the shrouds such that the plurality of nozzle airfoils are a portion of the single unitary structure.

17. The gas turbine engine of claim 16, wherein the inner liner, the inner band of the nozzle portion of the first turbine stage, the outer liner, the outer bands, the shrouds, and the plurality of nozzle airfoils are integrally formed from a ceramic matrix composite material such that the single unitary structure is a ceramic matrix composite component.

18. The gas turbine engine of claim 12, wherein the single unitary structure is formed from a plurality of ceramic matrix composite plies interspersed to form the single unitary structure.

19. The gas turbine engine of claim 12, wherein the outer liner, the outer bands, and the shrouds are integrally formed from a ceramic matrix composite material such that the single unitary structure is a ceramic matrix composite component, and wherein the ceramic matrix composite component is densified using a melt infiltration process.

* * * * *